July 13, 1943. H. D. COLMAN 2,324,280
CONTROL STRIP COMPOSING MACHINE
Filed Jan. 15, 1940 13 Sheets-Sheet 4
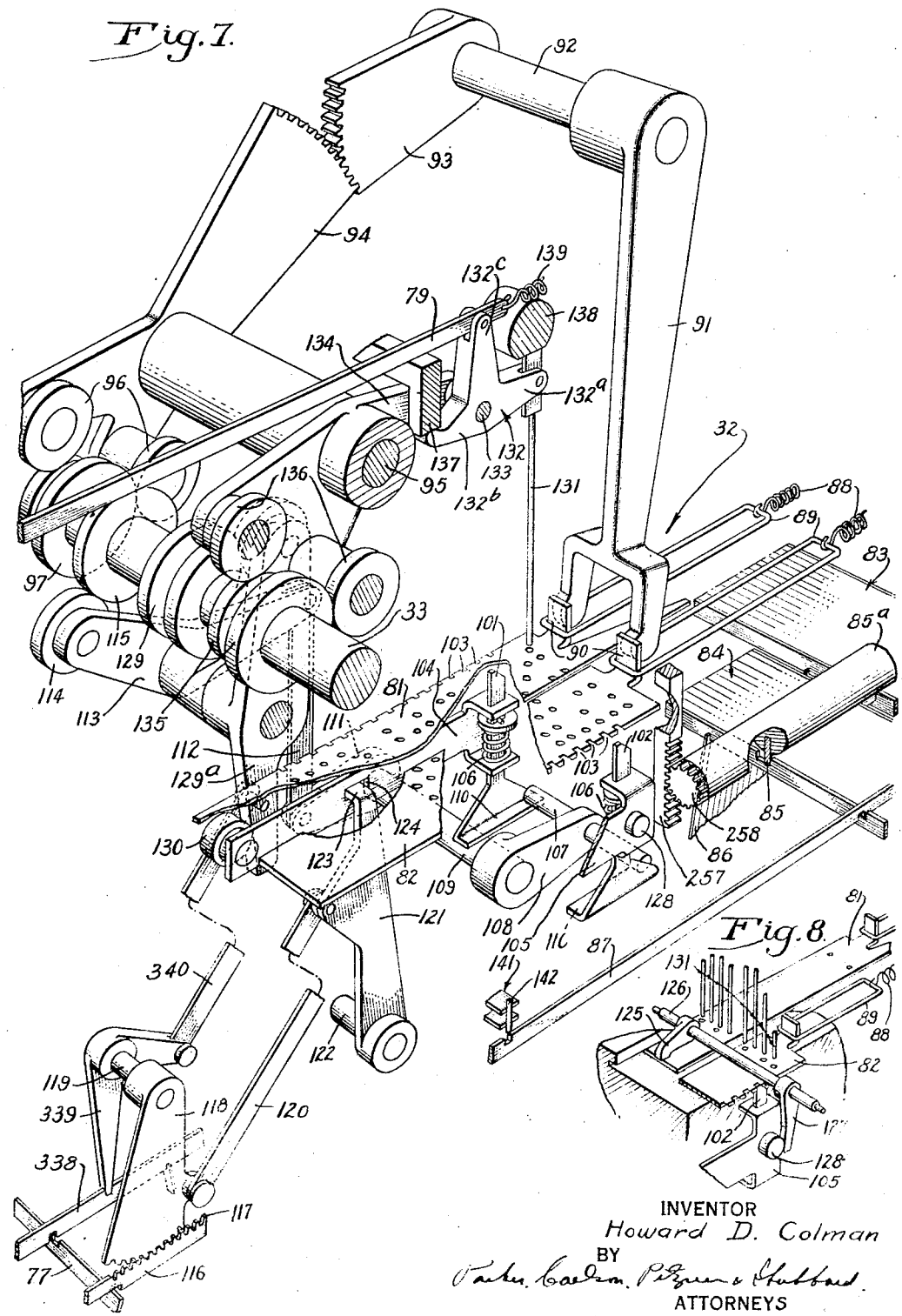
INVENTOR
Howard D. Colman
BY
ATTORNEYS

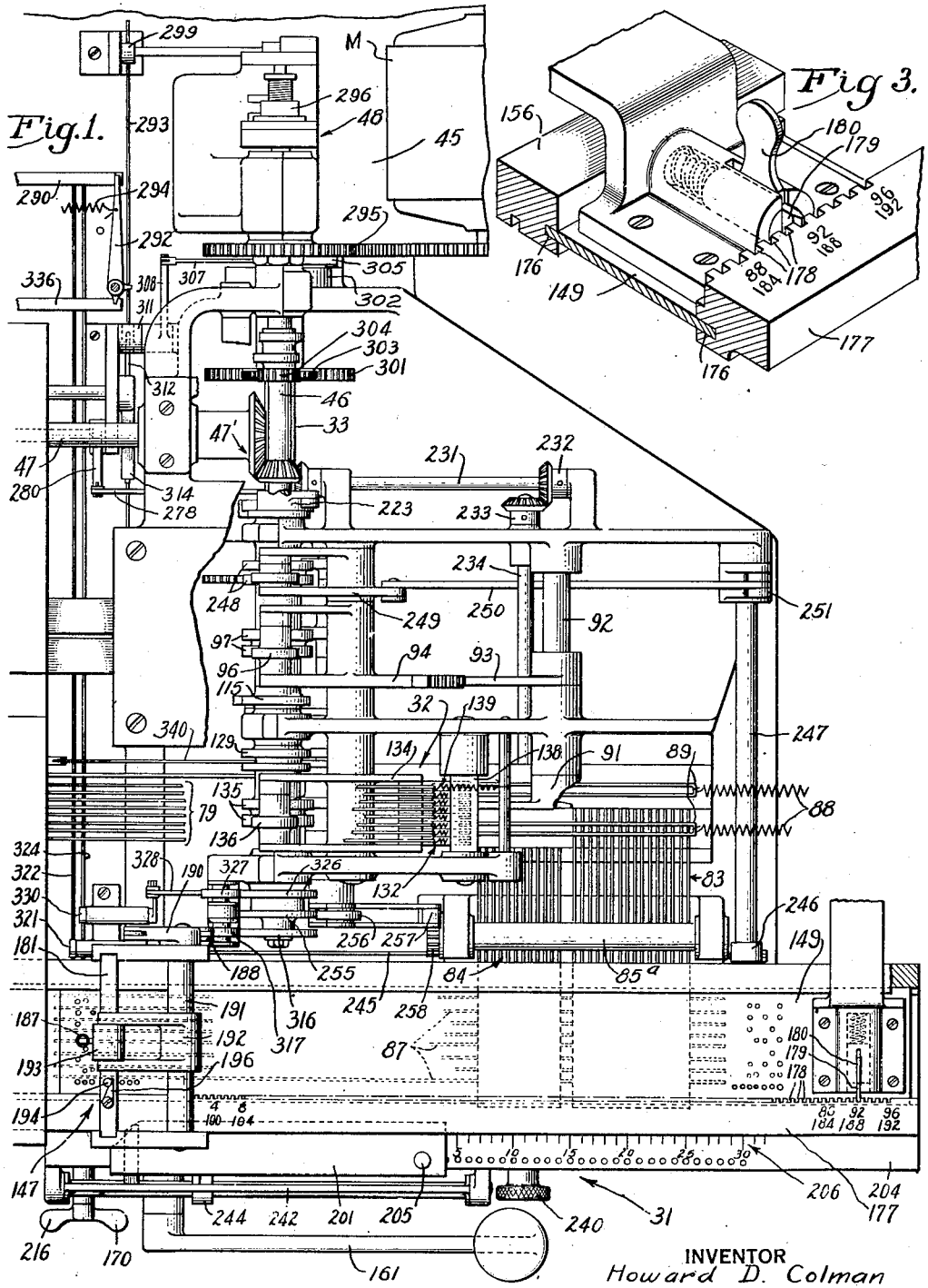

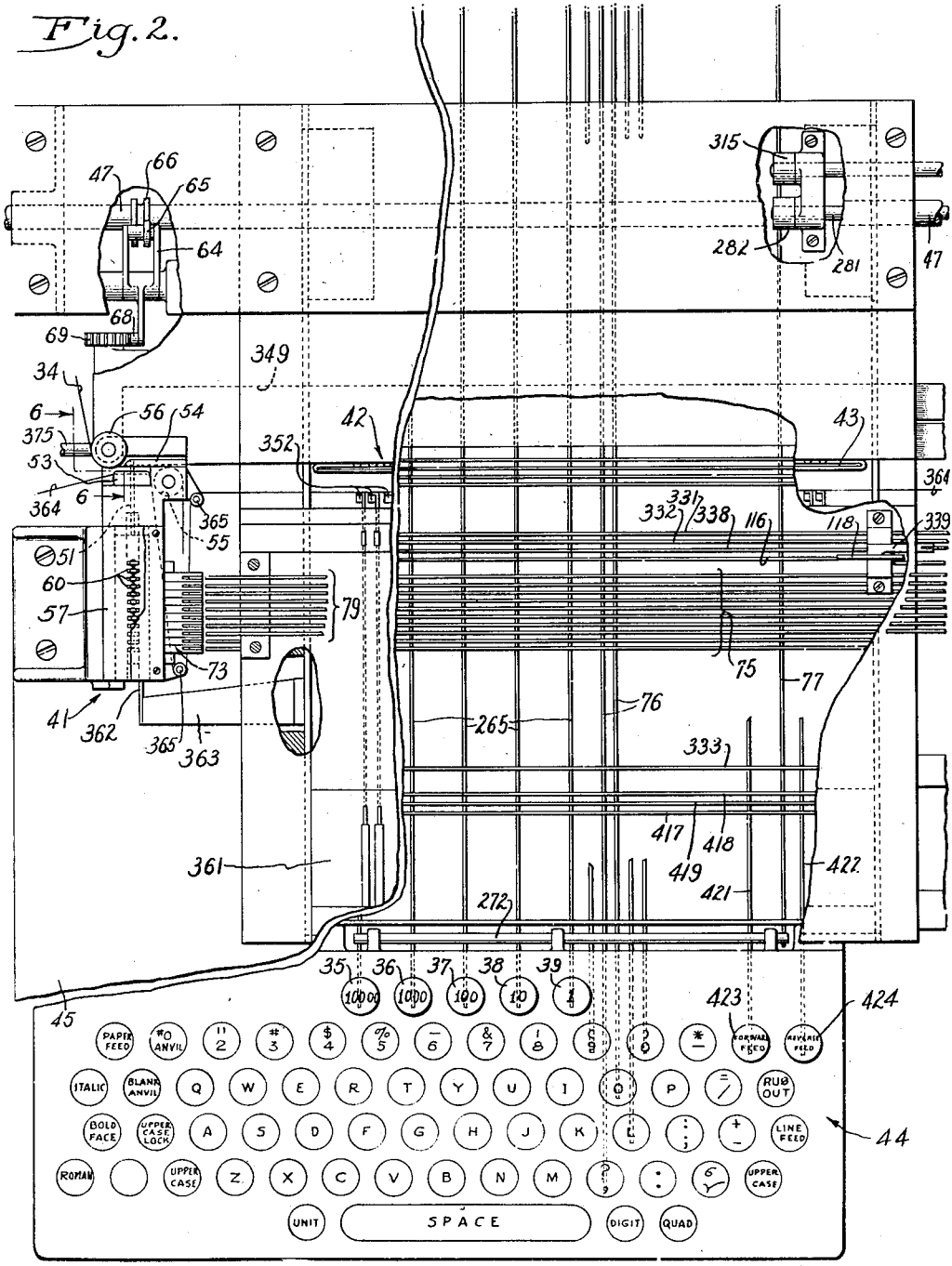

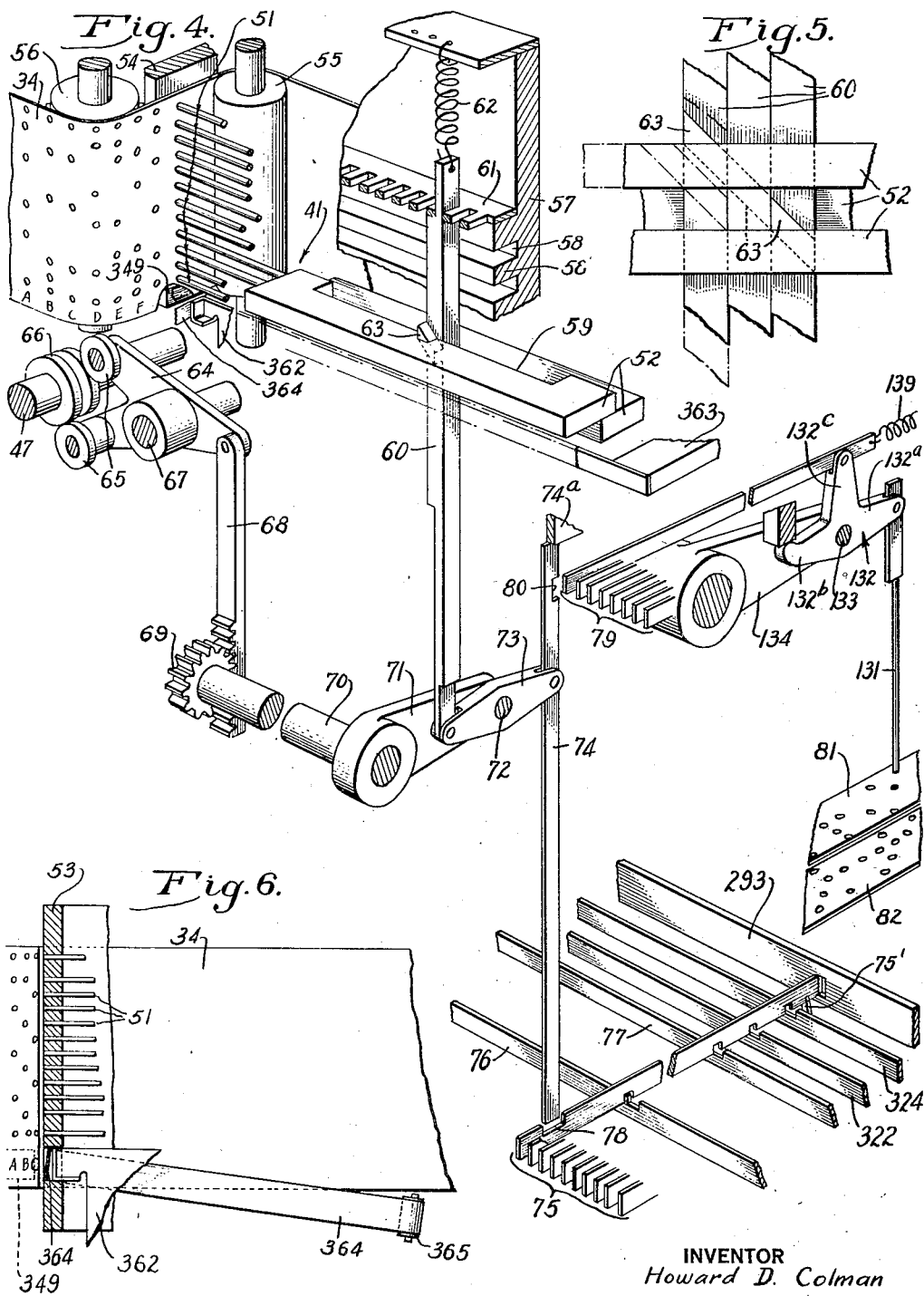

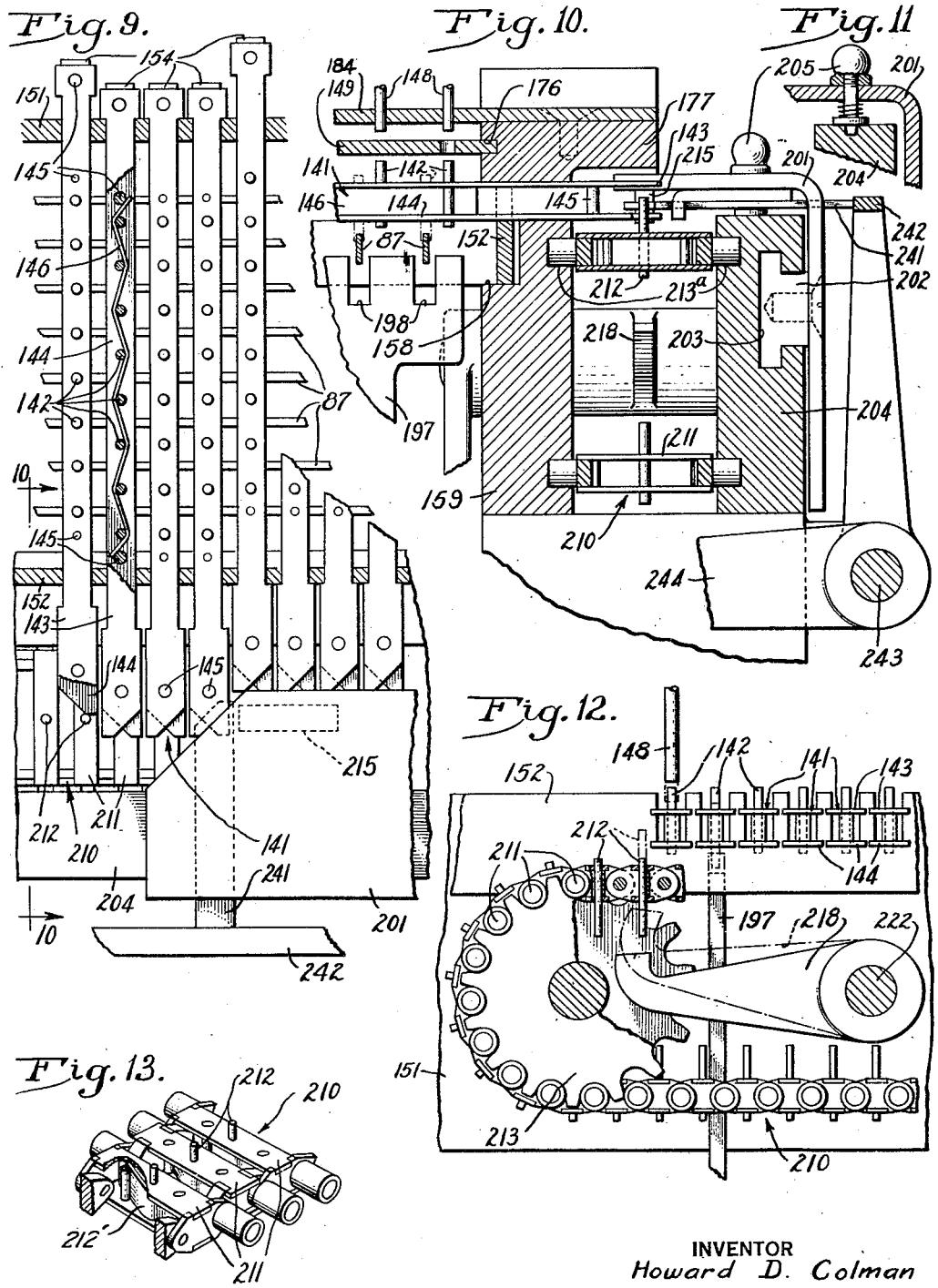

July 13, 1943.  H. D. COLMAN  2,324,280
CONTROL STRIP COMPOSING MACHINE
Filed Jan. 15, 1940  13 Sheets-Sheet 6

INVENTOR
Howard D. Colman
BY
ATTORNEYS

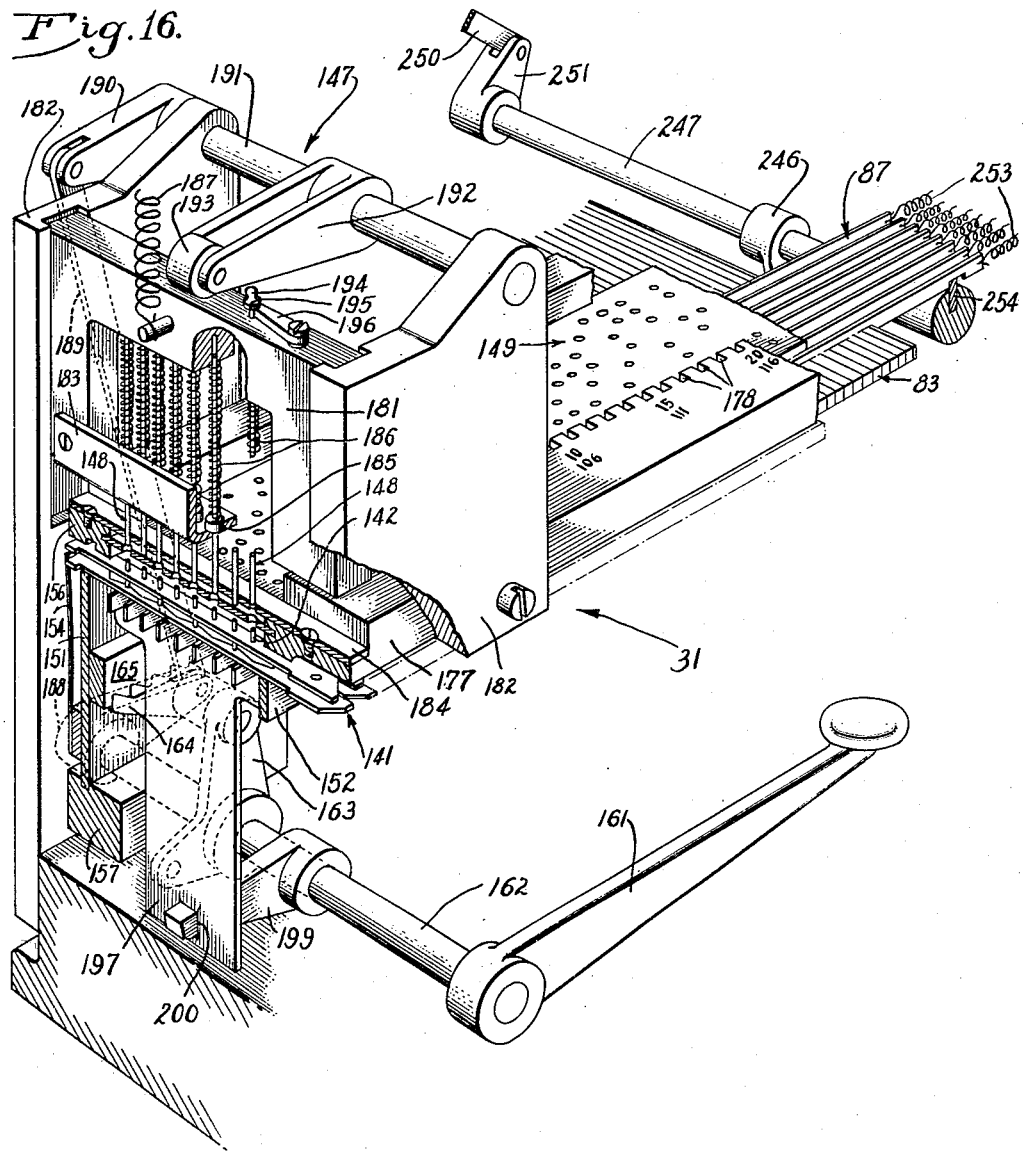

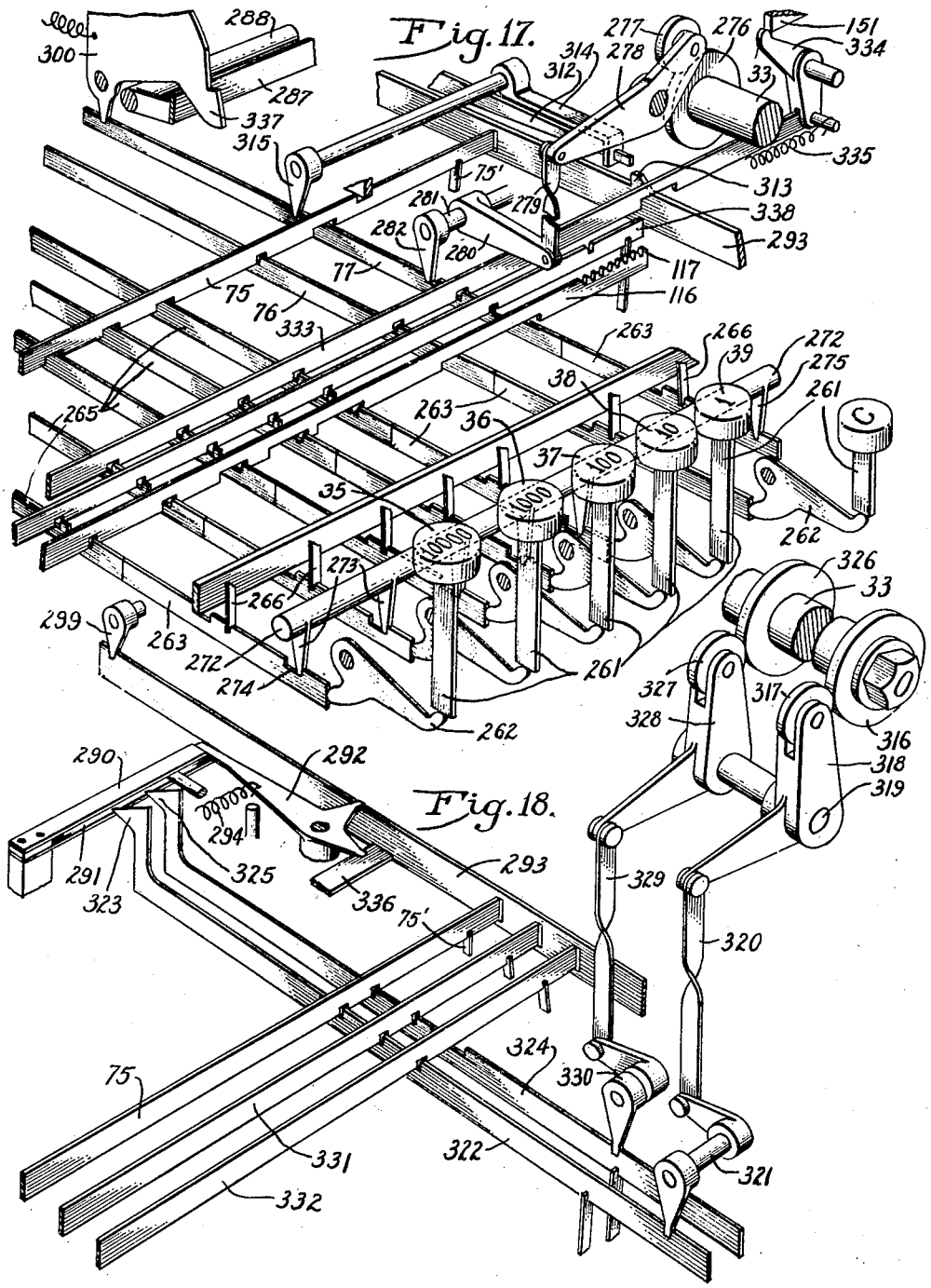

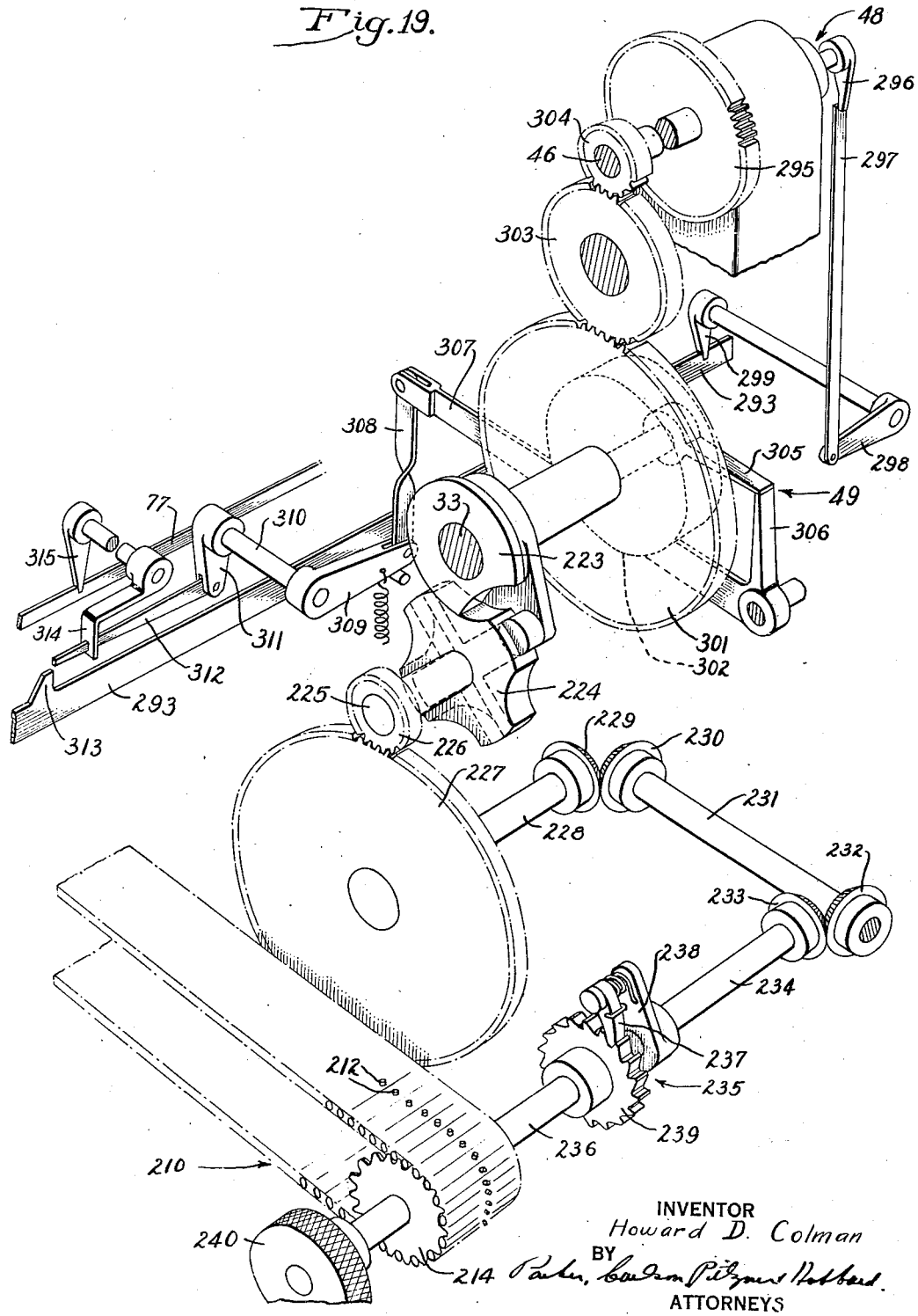

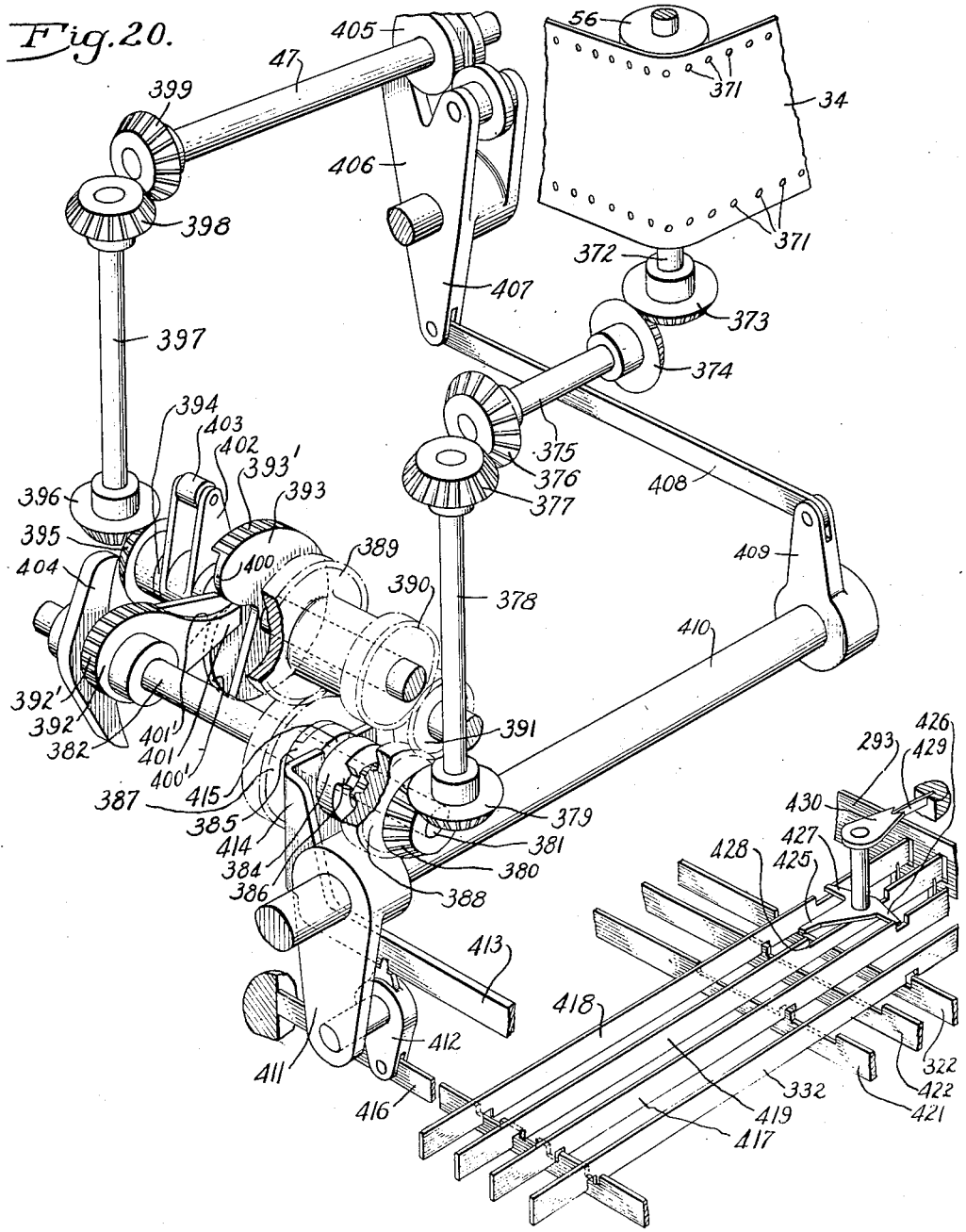

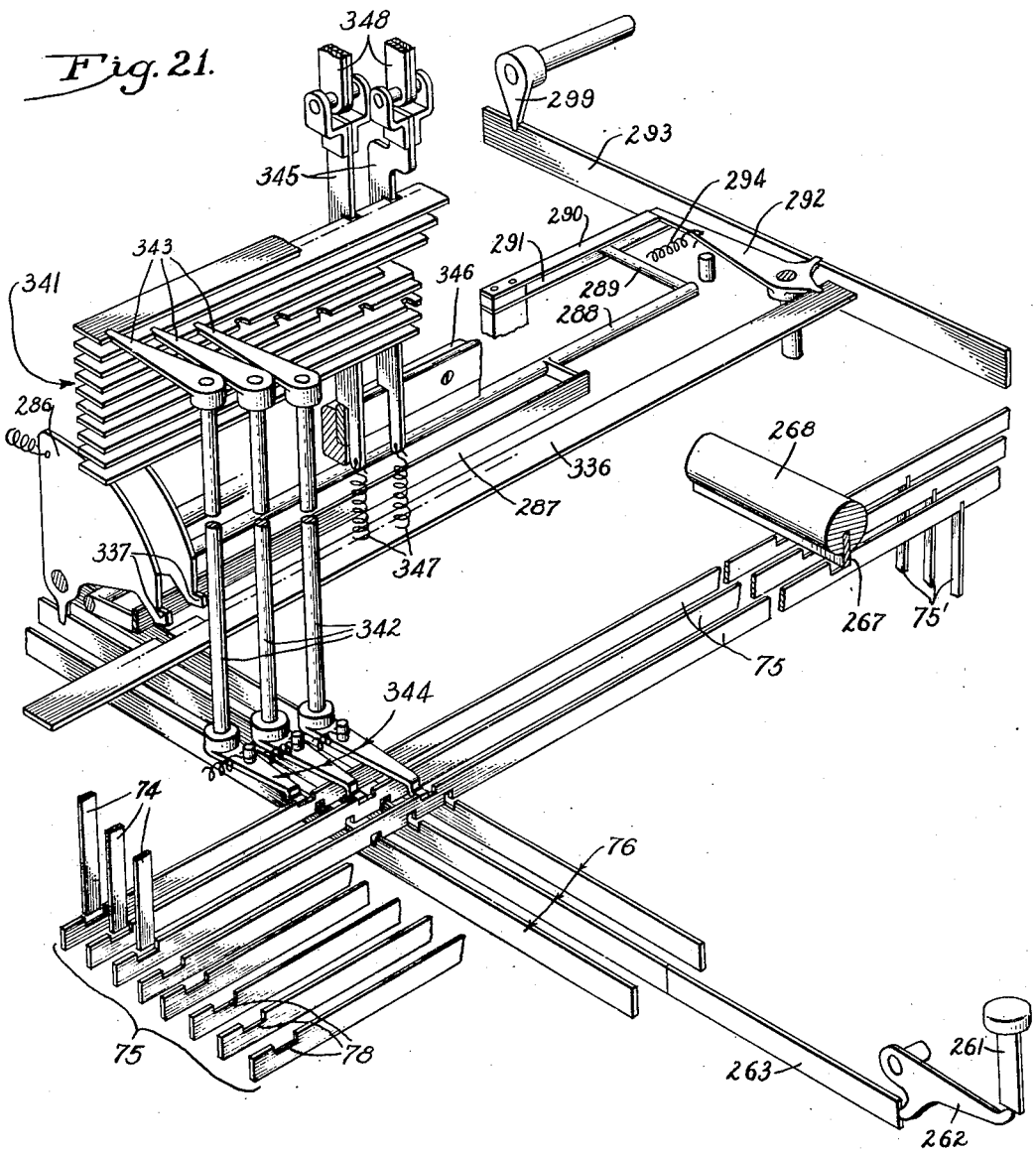

July 13, 1943.   H. D. COLMAN   2,324,280
CONTROL STRIP COMPOSING MACHINE
Filed Jan. 15, 1940   13 Sheets-Sheet 12

INVENTOR
Howard D. Colman
BY
ATTORNEYS

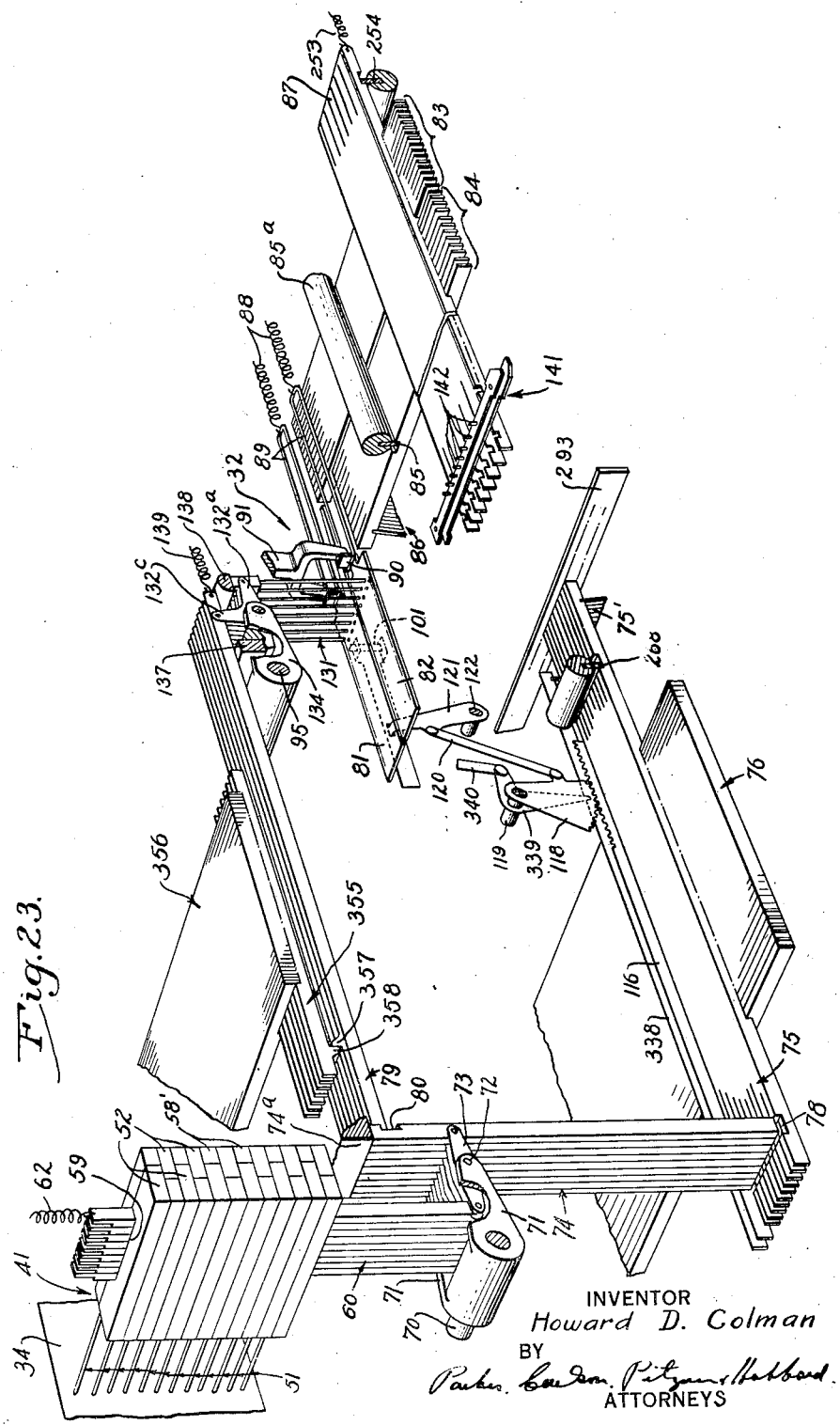

Patented July 13, 1943

2,324,280

UNITED STATES PATENT OFFICE 2,324,280

CONTROL STRIP COMPOSING MACHINE

Howard D. Colman, Rockford, Ill., assignor to Barber-Colman Company, Rockford, Ill., a corporation of Illinois Application January 15, 1940, Serial No. 313,851

81 Claims. (Cl. 164—112)

The invention relates to typographical composing machines of the general class in which composition is effected by the manipulation of the keys of a manual keyboard, and is more particularly concerned with machines for preparing control forms for use in controlling type or line casting machines, printing machines and allied typographic machines.

The primary object of the invention is to provide an improved tabulating mechanism which in its use in machines of the above general character greatly facilitates the composition of straight tabular matter or combinations of tabular and solid matter by simplifying the work of the operator and by eliminating time-consuming manual operations.

Another object is to provide a tabulating mechanism which in response to successive actuations of a single key is operative to automatically select and record a series of signal combinations, each designating the starting position of the lines of one of the tabular columns of a tabular composition, such signals being effective to control the typographic machine so that the characters or figures of the columns will invariably be in proper vertical alinement in the finished copy.

Another object is to provide a tabulating mechanism which is automatically operative to select and record a signal combination representative of a specific digit position in a column upon actuation of a key corresponding to such position, the signal varying according to the columnar arrangement employed and the particular column involved.

Still another object is to provide a tabulating mechanism which has a wide range of adjustment and which can be quickly and easily set to conform to any desired tabular arrangement as regards the number and relative location of the tabular columns and which when set is automatically operative upon actuation of a tabulating key to select and record the proper signal combinations to insure printing of the characters in the desired location in the finished copy.

In carrying out the foregoing objects, I provide a mechanism which is adapted to be incorporated in a keyboard-controlled composing machine such as a tape perforator. Through the medium of this mechanism, the operator is enabled by a single key actuation to select and perforate or otherwise record on the control tape the various signal combinations required to control a typographic machine in producing tabular matter in accordance with a predetermined plan without requiring any manual adjustment or setting of the casting or printing machine for this purpose.

The problem involved in producing a practicable mechanism of the above character is complicated by the fact that tabular arrangements vary widely in different compositions. Accordingly, provision is made in the improved mechanism whereby it may be quickly and accurately adjusted or set before composition is started so as to produce any desired tabular arrangement. As an example, the mechanism may be set for any desired number of columns, thirty-two columns being the maximum in the exemplary mechanism herein disclosed. These columns may be located at any desired positions measured lengthwise of the line as it appears in the finished copy. Such adjustment is made only when the tabular arrangement is changed from that previously composed, and once made, the selection of signal combinations and their recordation on the control tape are effected automatically in response to the actuation of a tabulating key of the keyboard.

The work of the operator is further facilitated and the necessity of back spacing or forward spacing when composing columns of figures which differ in the number of digits is reduced to a minimum by the provision of a plurality of tabulating keys corresponding to different digit positions of the columns. The tabulating mechanism includes means operated under the control of these keys for automatically selecting a signal representative of the digit position indicated by the key actuated. In other words, upon actuation of any one of the keys, the mechanism automatically calculates the specific position in the line at which the first figure in any given column is to appear in the finished copy, and it further automatically selects the proper signal combination to cause the typographic machine to produce the desired result. Thus, while the invention in its broader aspects seeks to faciliteate the composition of the tabular matter, it has for one of its special objects the provision of a mechanism which can be readily incorporated in a perforating or other composing machine in which it is adapted to cooperate with the other elements of the machine to increase its range of usefulness by making it available for composition of substantially any type of copy.

Another object of the invention is to provide an improved tabulating mechanism for simultaneously controlling printing and perforating mechanisms in a composing machine, the latter operating to record signals on a control form for subsequent control of a typographic machine, while the former produces a printed proof corresponding in arrangement to the final copy produced by the typographic machine whereby to provide a visible record for the guidance of the operator.

A more specific object is to provide an improved tabulating mechanism for controlling tape perforating machines which, in response to the actuation of a single manually operable key, is operative automatically to effect recordation of two distinct signal combinations on the control tape, one of said signal combinations serving to condition the typographic machine for the tabulating operation, the second signal combination serving to control the machine to effect printing in a predetermined position in a line.

A further object is to provide novel tape feeding mechanism adapted for high speed operation and operative to feed the tape either forwardly or backwardly.

A still further object is to provide novel means for interrupting the tape feed during operating cycles in which no signals are perforated, thereby conserving tape and eliminating blank positions which cause loss of time through idle cycling of the typographic machine controlled by the tape.

The objects of the invention above set forth, together with other and ancillary advantages, are attained by the construction and arrangement illustrated in the accompanying drawings and hereinafter more particularly described. It is to be understood, however, that various changes in the form, construction and arrangement of the parts may be made by those skilled in the art, without deparing from the spirit and scope of the invention as defined by the appended claims.

In the accompanying drawings:

Figures 1 and 2, when placed side by side with the latter figure at the left, constitute a plan view of a composing machine embodying the features of the invention.

Fig. 3 is a detail view of the setting slide locking detent.

Fig. 4 is a fragmentary perspective view of the tape perforating mechanism.

Fig. 5 shows a detail of the punch actuating mechanism.

Fig. 6 is a vertical sectional view taken along the line 6—6 of Fig. 2.

Fig. 7 is a perspective view of the master tapes and associated mechanisms.

Fig. 8 is a perspective view showing details of the master tape positioning mechanism.

Fig. 9 is a fragmentary plan view of the pin bars and the associated mechanism for selectively locking out all bars except one for each column of the composition.

Fig. 10 is a vertical sectional view taken along the line 10—10 of Fig. 9.

Fig. 11 is a view, partly in section, showing details of the column slide detent.

Fig. 12 is a fragmentary vertical sectional view showing the pin bar chain for rendering the pin bars effective in proper sequence.

Fig. 13 is a fragmentary perspective view showing details of the pin bar chain.

Fig. 16 is a fragmentary perspective view of the manually operated setting mechanism by which the control unit of the tabulating mechanism may be adjusted for different tabular arrangements. This figure also shows certain of the pin bars and the manner in which the pins of the bars are set to designate the positions in a line at which the various columns are located.

Fig. 17 is a fragmentary perspective view of the keyboard showing the tabulating keys and associated mechanism.

Fig. 18 is a perspective view of a part of the mechanism for controlling the operating cycle of the machine in the composition of tabular matter.

Fig. 19 is a perspective view of the power driven mechanism including the tabulating cam shaft and control devices associated therewith.

Fig. 20 is a fragmentary perspective view of the tape feed mechanism and associated control apparatus.

Fig. 21 is a fragmentary perspective view of the keyboard showing the character keys and associated selector mechanism by which the perforating and printing mechanisms are selectively controlled.

Fig. 23 is a fragmentary perspective view showing the relationship of various operating and control instrumentalities of the machine.

Figure 14:
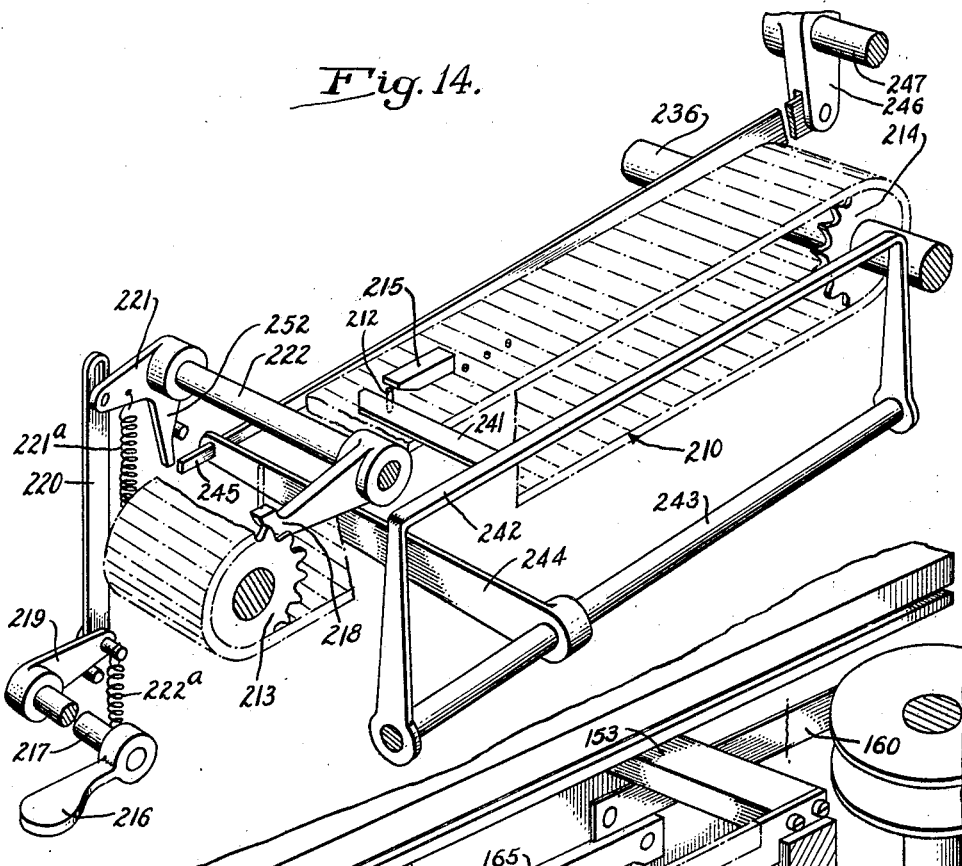
Fig. 14 is a perspective view of the pin bar chain and associated manual and automatic means for setting and blanking the pins.

By way of illustration, the invention is shown and will hereinafter be described as applied to a keyboard-operated control strip perforator, which is equipped with keyboard mechanism and printing mechanism similar to that disclosed and claimed in my copending application Serial No. 62,742, filed February 7, 1936, now Patent No. 2,196,354, granted April 9, 1940. Since the printing mechanism per se forms no part of the present invention, only those parts have been illustrated which are necessary for an understanding of the relationship and coaction of the several mechanisms, and reference may be had to the above mentioned application for a description of the details of construction. While, as stated, the invention has been shown in connection with a perforating machine, it should be understood that any other form of tape marking apparatus might be employed instead, and the reference in the appended claims to a tape perforating apparatus and a perforated tape is intended to comprehend any kind of control form whose symbols are capable of controlling the operation of a typographic machine.

The control form produced by the machine to be described is particularly suitable for the control of a type casting machine. It will be understood, however, that other forms of typographic machines, such as line casting machines, type assembling machines and printing machines, may be equipped readily with mechanisms for responding to these signals on the control form to produce finished copy in accordance therewith.

*In general*

The tabulating mechanism comprising the principal feature of the present invention is adapted to be incorporated in a composing machine such as a control tape perforator without in any way affecting the operation of the machine in the composition of non-tabular matter. Its primary function is to select and record appropriate signals on the control tape for causing the typographic machine to arrange the printed matter in a desired tabular form. The signals employed for this purpose are preferably of the permutational code type.

Referring to Fig. 1, the tabulating mechanism as herein shown comprises generally a tabular form designating mechanism 31 and a position signal selector 32 controlled thereby. The mechanism 31 includes a control unit having a plurality of selectively settable elements and suitable means for setting the elements manually in a pattern corresponding to or designating the particular tabular form to be printed in the final copy. More particularly, the control unit is set to designate the number of columns and the precise location of each column in the final copy. The position signal selector 32, is actuated by a rotary controller or shaft 33, hereinafter referred to as the tabulating cam shaft, to select the signal combinations designated by the mechanism 31 and to cause such signals to be recorded on a control tape 34 (Figs. 2 and 4).

Perforators of the above general character are ordinarily arranged for cyclic operation, that is, the operative elements thereof execute a complete cycle for each signal recorded or for each functional operation performed. The tabulating mechanism of the present invention is accordingly arranged for operation in cycles hereinafter referred to as tabulating cycles, accurately coordinated with the operating cycles of the machine in which it is incorporated. To this end, the tabulating cam shaft which times the operation of the mechanism is conveniently driven from the cam shaft which times the operation of the machine as will be explained in detail hereinafter.

The invention contemplates the use of two signals for each tabulating cycle of the typographic machine to be controlled. One of these signals, herein called the tabulating signal, conditions the typographic machine for tabulating and is the same in each tabulating cycle. The second signal, called the tabulating numeral signal, designates the particular position in the line in which a predetermined vertical row of numerals or digit column of a tabular column, as, for example, the first row counting from left to right, is to appear. A separate and distinctive permutational code signal is allocated to each printing or digit position in the line. Since numerals are most frequently used in tabular composition, it is preferable to divide the line into digit positions of one-half em width, this being the standard set width of the numerals 0 to 9 as employed in the typographic art.

The tabular form designating mechanism 31 is set manually, as will be described in detail hereinafter, in accordance with the desired tabular form, that is, the number of tabular columns and the exact location in the line of a suitable reference point in each column. Such reference point may conveniently be the digit position at the extreme left edge of the column. This position is referred to throughout this specification as the initial digit position of the column. Thereafter, the operator simply actuates a tabulating key to initiate operation of the tabulating cam shaft 33 and the position signal selector 32 selects the proper signal combination designated by the mechanism 31 and records the signal on the control tape 34.

It is usually desirable in tabulating numerical items to have the digits of the same value, e. g., units digits, tens digits, hundreds digits, etc., alined vertically. Accordingly, when items differing in number of digits are being tabulated only those with the maximum number of digits will start with the left hand digit in the initial digit position of the column. Shorter items will start in succeeding digit positions of the column so that the digits of the same value will aline properly with those of the long items. Under these conditions it is necessary to modify the action of the selecting mechanism to enable it to select a signal that represents the desired digit position in the column rather than the first digit position for which the form designating mechanism has been set. To this end, there is provided a plurality of tabulating keys each corresponding to a different digit position in the column.

As shown in Fig. 2, five tabulating keys designated respectively by the reference characters 35 to 39 are provided in the exemplary mechanism herein disclosed. Key 35 represents the first digit position of the column, key 36 the second digit position, key 37 the third digit position, etc. The last four keys act to modify the operation of the selecting mechanism as will be explained in detail hereinafter so that short items will appear in their proper positions in the column.

*Machine structure*

Referring now to the drawings, the composing machine selected to illustrate the invention comprises generally a signal recorder in the form of a punch mechanism 41 (Figs. 2, 4 and 23) for perforating permutational combinations of holes in the control tape 34, and a proof printing mechanism 42 (Figs. 2 and 22) for simultaneously printing on a proof sheet 43 characters corresponding to the tape signals to provide a visual record for the guidance of the operator. Both mechanisms are controlled selectively from a manually operable keyboard 44 (Fig. 2).

The tabulating mechanism above referred to is assembled in a unitary structure with the perforating and printing mechanisms and the tabulating keys 35 to 39, inclusive, are conveniently arranged in the keyboard 44. As herein shown, the various mechanisms are supported on a suitable base or frame 45 and are arranged to be operated by a common motor M through the medium of a main drive shaft 46 (Figs. 1 and 19).

The operations of the mechanisms are coordinated and controlled by means of suitable controllers or control devices preferably of the rotary type such as cam shafts including a main cam shaft 47 (Figs. 1, 2 and 20) and the tabulating cam shaft 33 (Figs. 1, 7 and 19). As herein shown, the main cam shaft 47 is coupled directly to the drive shaft 46 by bevel gearing 47' (Fig. 1) so as to execute a half revolution or one cycle in each revolution of the main shaft. A suitable clutch 49, which may be of the friction type adapted to be released under control of the keyboard as hereinafter set forth, is interposed between the motor and the main drive shaft 46 for controlling its cyclic operation.

The tabulating cam shaft 33 is arranged to be positively driven from the main drive shaft in a manner such that each revolution or cycle of the tabulating cam shaft is a multiple of the main cam shaft. In the exemplary machine four revolutions of the main shaft, that is, four cycles of the main cam shaft 47 are required to drive the tabulating cam shaft 33 through a single cycle. As rotation of the cam shaft is required only when the tabulating mechanism is in operation a clutch 49 (Fig. 19), preferably of the positive acting type, hereinafter referred to as the tabulating cam shaft clutch, is interposed between it and the main drive shaft 46 and suitable controls are provided for engaging and disengaging the clutch as will appear presently.

When used for ordinary composition, the clutch 49 is disengaged and the tabulating mechanism is thus rendered inactive. The clutch 48 is engaged however in response to each actuation of a character key of the keyboard to operate the main cam shaft 47 through a single operating cycle. In this operating cycle, the perforating mechanism 41 punches a permutational code signal in the tape 34 corresponding to the character or numeral represented by the key actuated. At the same time, the printing mechanism 42 prints the corresponding character or numeral on the proof sheet 43 and on the control tape adjacent the row of holes constituting the signal.

When the machine is used for tabular composition, both the main clutch 48 and the tabulating cam shaft clutch 49 are tripped and remain in driving engagement until the tabulating cam shaft completes a full revolution or tabulating cycle. In this cycle, the tabulating signal is first perforated in the control tape followed by the selection of and perforation in the tape of the tabulating numeral signal. The provision whereby the main drive shaft is required to execute four complete cycles for each cycle of the tabulating cam shaft allows sufficient time for the performance of the above operations.

The printing mechanism 42, as herein shown, is arranged to print a distinctive signal identifying the tabulating signal simultaneously with the perforation of such signal in the control tape. No printing takes place in the selection and recording of the tabulating numeral signal but, instead, the mechanism is conditioned for printing in a particular position on the proof sheet in the next operating cycle of the machine. The construction and mode of operation of this mechanism is fully shown and described in Patent No. 2,196,354 above referred to.

Signal recording

In the machine selected to illustrate the invention, the signals are recorded by the punch mechanism 41 which perforates a permutational group of holes in the control tape. As shown in Fig. 4, this mechanism comprises a group of twelve punches 51 carried by individual slides 52 arranged for movement toward and from the plane of the control tape 34. The tape is fed between a guide plate 53 (Fig. 6) suitably apertured to receive the punches 51 and a shear plate 54 (Fig. 4) which cooperates with the punches so that the holes are punched cleanly without tearing the tape. As shown in Fig. 4, rollers 55 and 56 are provided for guiding the tape into operative relation to the punches, the roller 56 having sprocket teeth engaging feed holes in the tape and being driven intermittently for feeding the tape forwardly step by step in timed relation to successive operations of the punch mechanism as will appear presently.

The slides 52 which in effect constitute extensions of the respective punches 51 are preferably in the form of flat bars arranged in staggered relation with their inner edges overlapping as shown in Figs. 4 and 23. Frames 57 disposed on opposite sides of the slide assembly are formed with suitable guide slots 58 separated by tongues 58' of substantially the same thickness as the slides whereby the grooves are positioned for the reception of alternate slides of the assembly. As shown in Fig. 4, the slides 52 are recessed along their inner edges as indicated at 59 for the reception of transversely disposed punch operating bars 60, there being one bar for each punch. The bars are guided at their upper ends by a comb 61 carried on the frames 57 and are normally held in an elevated position by individual springs 62.

Each of the bars 60 is operatively associated with one of the slides 52 by means of a lug 63 on the bar which engages in a complementary slot in the slide. The lug and slot are disposed at an angle to the longitudinal axes of the bar and slide as shown in Fig. 4 whereby endwise movement of the bar in one direction is effective to cam the slide toward the control tape while movement of the bar in the other direction serves to cam the slide in the opposite direction.

Power actuated means is provided for operating the bars 60 to advance and retract selected slides 52 and their associated punches 51 in proper timed relation to the other operations of the machine. As herein shown, this means comprises a common actuator such as a rocker member 64 (Figs. 2 and 4) having a double cam follower in the form of rollers 65 coacting with a cam 66 on the main cam shaft 47. As previously stated, the main cam shaft is driven directly from the main drive shaft 46 so as to rotate through a half revolution in each operating cycle of the machine. The cam 66 is so shaped that in this rotation of the cam shaft the member 64 is oscillated about its pivot 67 and, through suitable operative connections, actuates the punches selectively, first advancing them into engagement with the control tape and then retracting them to normal position.

The foregoing operation is carried out through the medium of a bar 68 pivoted at one end of the member 64 and having rack teeth adjacent its other end adapted to mesh with the teeth of a pinion 69 fast on a rock shaft 70. A bail comprising a pair of spaced arms 71 fast on the rock shaft and a cross shaft or rod 72 pivotally supports a series of floating levers 73, one for each punch operating bar 60. Each punch operating bar 60 is pivotally connected to one end of its associated floating lever 73. Pivoted on the other end of the lever 73 is a feeler bar 74 adapted to coperate at its lower end with control bars 75 which constitute a part of the permutation selector mechanism of the machine. The upper ends of the bars 74 normally abut against a stationary stop 74a.

The control bars 75 are arranged to be shifted in various permutational combinations to control the operation of the punches 51 in recording both character and tabulating signals. The bars in this instance are released for endwise movement by leaf springs 75' under control of codal elements or flags 76 and 77 forming part of the permutation selector mechanism and described in more detail hereinafter. Formed in the upper edge of each control bar is a notch 78 adapted to receive the associated feeler bar 74 when the control bar is in normal or retracted position. Upon oscillation of the member 64, the shaft 70 is rocked to carry the bail for the floating levers 73 bodily toward the control bars. This movement takes place subsequently to the setting of the control bars under control of the flags 76, 77, etc., when the latter are operated either in response to the actuating of a character key or a tabulating key. Under these conditions, certain of the control bars remain in normal position while others move to their advanced position.

The bars in normal position present their notches 78 for the reception of the feeler bars 74, and when the bail rod 72 moves downwardly, the feeler bars enter these notches and the floating levers 73 are caused to turn in a clockwise direction through the action of the springs 62 on the punch operating bars 60. The punches corresponding to the punch bars 60 whose feeler bars 74 enter notches 78 thus remain inactive and no perforation is made in the control tape.

The control bars 75 that have been shifted from normal position have their notches 78 withdrawn from the path of the associated feeler bars 74. Accordingly, when the floating lever bail is moved toward the control bars by the cam 66, the bars 74 are blocked by encountering an unnotched portion of the associated control bar. The floating levers 73 are thus rocked in a counterclockwise direction to draw the associated punch bars 60 downward whereby to advance the slides 52 and their associated punches 51 to perforate the control tape. It will be apparent therefore that the number and arrangement of the perforations in the tape, that is, the permutational value of the signal represented by these perforations corresponds to the setting of the control bars of the permutational selector mechanism.

To record the tabulating numeral signal, the feeler bars 74 are also arranged to cooperate with latch bars 79 herein shown as supported for endwise sliding movement transversely of the feeler bars and disposed above the control bars 75. Each bar 79 when shifted into operated position, engages in a notch 80 in the side of the associated feeler bar. The feeler bar is thus blocked against downward movement when the floating lever bail is rocked and, accordingly, the punch corresponding to the blocked feeler bar is advanced to perforate a hole in the control tape. The latch bars 79 are positioned in accordance with the signal selected by the tabulating mechanism, as will appear presently; hence, the signal perforated in the control tape under the control of the latch bars 79 will correspond exactly to the selected tabulating numeral signal.

*Tabulating numeral signal selection*

Since the initial digit position of a tabular column may fall in any digit position in a line, it is desirable to provide for the selection of a signal combination individual to each digit position in the line. The selection of the proper signal for a particular form of composition is the function of the position signal selector 32. In the preferred form illustrated in Figs. 4 and 7, the selector mechanism comprises a master control form providing signal combinations individual to each digit position and governing the operation of the punches to produce the desired number of signals on the paper tape. Preferably the control form is variable selectively to provide a large number of different signal combinations while occupying a relatively small area. Thus it is composed of a plurality of relatively shiftable sections consisting in the present instance of a pair of flat metal strips or tapes 81 and 82, hereinafter referred to as the primary master tape and the secondary master tape, respectively. The latter tape is provided with a series of signal combinations each representing a particular section of a line while the primary master tape is provided with a series of signals each representing a specific subdivision of a section. The subdivisions, in the present instance are of one-half em width, that is, the same width as a digit position of the line. Accordingly, by properly combining selected signals on the two master tapes, a composite signal of distinctive character may be formed to represent any digit position in the line.

In the exemplary embodiment herein disclosed, the signal combinations on the master tapes are in the form of permutational sets of holes arranged in rows extending transversely of the tapes, and the tapes are supported side by side in a common plane so that any set of holes in one tape may be alined with any set of holes in the other tape by the relative shifting of the tapes. As herein shown, each tape has four hole positions in each row, affording a maximum of sixteen different signal combinations per tape. By sliding the tapes endwise, one relative to the other, any row of holes in the one tape may be alined with any row of holes in the other tape to form an eight-unit code signal, thus giving the control form a capacity equal to the product of the number of different signal combinations in the two tapes.

In the machine selected to illustrate the invention only 192 different signal combinations are used which is sufficient to designate all of the digit positions in an eight-inch line printed in six-point type. The primary master tape 81 is therefore provided with sixteen different four-unit combinations, while the secondary master tape 82 is provided with twelve different four-unit combinations. For reasons to be explained presently, the first four combinations on the tape 81 are repeated at the end of the series so that there are actually twenty rows of holes in this tape.

The positioning of the master tapes 81 and 82 to aline predetermined rows of holes in the two tapes and thereby select an eight-unit signal combination is effected primarily by the control unit 31 of the tabulating mechanism through the medium of two groups of combination bars 83 and 84 operatively associated with the respective tapes. The combination bars are arranged transversely of and in the same plane as the tapes but are normally held out of the path of the tapes by a bail 85 carried on a rock shaft 85ª. When the bail is withdrawn, one bar in each group is moved rearwardly by an associated leaf spring 86 so as to act as a stop to limit a shifting movement (to the right in Fig. 7) of the associated master tape. As the spacing of the bars corresponds to the pitch of the rows of holes in the tape, it will be apparent that any desired alinement of the rows may be obtained by selective release of the combination bars. This selective release is effected, in the present instance, by code bars 87 forming a part of the control unit 31 to be described hereinafter.

The selective shifting of the master tapes 81 and 82 as determined by their engagement with the operated control bars is effected by individual tension springs 88 (Figs. 7 and 23) operatively connected therewith by yokes 89 which engage upstanding lugs 90 formed adjacent the ends of the respective tapes. The tapes are normally held in a forward position against the action of the springs by a master tape arm 91 swingably mounted above the tapes and having its free end bifurcated to form spaced fingers engageable with the lugs 90 of the respective tapes. As shown in Fig. 7, the arm 91 is mounted on a rock shaft 92 which has a segmental gear 93 meshing with teeth formed in the rearwardly extending portion of a rocking member 94 loosely mounted on a cross shaft 95. The forward end of the rocking member is formed to provide two spaced arms each of which carries a cam follower in the form of a roller 96 engageable with a cam 97 on the tabulating cam shaft 33. Through the action of the cam 97, the arm 91 is withdrawn and the master tapes 81 and 82 are thus released to the control of the combination bars 83 and 84 at a predetermined point in each tabulating cycle. The tapes are returned to normal rest position by the action of the cam after the selected tabulating numeral signal has been recorded on the control tape.

Means is provided for latching the two sections of the master form in different set positions so as to position the sections accurately during the transfer of the selected signal combination to the signal recording mechanism. As herein shown, this means includes a latch bolt 101 cooperating with the primary master tape 81 and a latch bolt 102 cooperating with the secondary master tape 82. Each bolt has a tapered nose adapted to engage in suitable notches 103 formed in opposite lateral edges of the respective tapes (see Fig. 8). The shape of the notches 103 and the ends of the bolts 101 and 102 are such that the tapes 81 and 82 are positively locked against advancing motion by the springs 88, yet the tapes may be withdrawn to normal position by the arm 91. In this withdrawal, the bolts are cammed out of engagement with the tapes by the inclined sides of the notches. The notches are spaced apart so that when the bolts are entered, the rows of holes will be alined accurately.

The bolts 101 and 102 are supported for movement toward and from the master tapes by slides 104 and 105 disposed below the tapes. Springs 106 acting on the bolts tend to move them into engagement with the notches 103. Such movement is prevented and the bolts are normally held in a withdrawn position by a bail 107 carried on an arm 108 of a rock shaft 109, the bail engaging inwardly projecting flanges 110 formed on the lower edges of the respective bolts. The shaft 109 is operatively connected by an arm 111 and a link 112 with a rocker arm 113 which has a cam follower 114 cooperating with a cam 115 on the tabulating cam shaft 33. The cam 115 is so shaped that the bail 107 is raised to permit the latch bolts to enter the notches 103 at the proper point in the tabulating cycle after the tapes have been shifted in the formation of a predetermined signal combination.

*Supplemental positioning of master tapes*

In the preferred form of the invention, the combination bars 83 and 84 are arranged to operate in successive cycles to set the master tapes 81 and 82 so as to form signal combinations designating the first digit position of the successive tabular columns. When the first figure or character of an item is to be printed in a digit position other than the initial digit position of the column, a supplemental positioning of the master tapes is required. Thus when a four-figure item appears in a column having five digit positions, the first figure of the item must be placed in the second digit position of the column and accordingly the signal selected by the initial positioning of the master tapes must be modified to designate the second digit position. Similar signal modification is required in the case of three, two or single figure items. This modification is effected by the supplemental positioning of the master tapes under control of the particular tabular key selected to initiate the tabulating cycle as will appear presently.

The supplemental setting of the master tapes is effected in the present instance by releasing the latch bolt supporting slides 104 and 105 for movement with the master tapes under the influence of the master tape actuating springs. If printing is to be effected in the second digit position of the column, the slide 104 is permitted to advance one step to aline the next adjacent row of holes in the tape 81 with the selected row in the tape 82. For printing in the third digit position of the column, the tape is advanced two steps, for the fourth digit position three steps, etc.

The extent of supplemental movement of the master tape 81 is controlled by a digit positioner slide bar 116 which is freed for movement in steps of varying length in accordance with the particular tabulating key depressed. The bar 116 is formed with rack teeth 117 engaging a gear segment 118 supported on a transverse shaft 119 adjacent the right end of the keyboard. A link 120 connects the gear segment with a lever 121 pivoted at one end on a pin 122 and having at its other end a laterally projecting lug 123 engaging in a slot 124 in the slide 104. Thus, when the digit positioner slide bar 116 is released by the tabulating keys, primary master tape 81 is given a supplemental positioning movement to select a signal combination representing a digit position subsequent to the initial digit position of the column initially selected by the control unit of the tabulating mechanism.

Supplemental positioning of the secondary master tape 82 is required only when the primary master tape is initially positioned to select a signal representing a digit position in one section of the line and then permitted to advance one or more steps by the digit positioner slide bar to select a signal representing a digit position in the succeeding section of the line. Under these conditions, it is necessary to advance the secondary master tape one step in order to select the proper signal combination for the succeeding line section so that the combined signals will designate the correct position in the line.

The means provided for effecting the supplemental positioning of the tape 82, as shown in Fig. 8, comprises a tape rider in the form of an arm 125 fast on a rock shaft 126 journaled on the machine frame and extending transversely over the master tapes. Fast on the other end of the shaft 126 is an arm 127 engageable with a pin 128 carried on the slide 105. The relative positioning of the arms 125 and 127 is such that the slide is held in its normal rest position against the tension of the secondary master tape advancing spring 88 as long as the rider 125 is in engagement with the primary master tape 81. When the latter tape is advanced to select a row of holes beyond the sixteenth row, the rider drops over the end of the tape and thereby permits the slide 105 and secondary master tape to which it is latched to advance one step.

The slide 104 is restored to normal rest position at the end of the tabulating cycle by a cam 129 on the tabulating cam shaft acting through a pivoted cam follower 129a having an arm engageable with a roller 130 carried on the slide 104. The cam 129 is timed with respect to the cams 97 and 115 so that the return movement starts only after the master tapes have been picked up by the arm 91 and the latch bolts 101 and 102 have been withdrawn. In case the secondary master tape 82 has advanced, that is, if the tape rider 125 has passed over the end of the primary master tape 81, the return movement of the latter tape under the action of the arm 91 serves to rock the rider and shaft 126 which, through the arm 127, restores the slide 105 to normal position.

*Transfer of selected signal to recording mechanism*

The sets of holes constituting the tabulating numeral signal selected by the initial and supplemental positioning of the master tapes, as above described, are alined in operative relation to a set of master tape feelers 131 (Figs. 4, 7, 8 and 23). Each feeler is carried on a floating lever 132 in the form of a bell crank having a pair of oppositely extending horizontal arms 132$^a$ and 132$^b$ and a vertical arm 132$^c$, the feeler being pivotally secured to the arm 132$^a$. The floating levers are pivotally supported on a shaft 133 carried on the rearwardly extending arms of an oscillating member 134 loosely mounted on the cross shaft 95. The arm 132$^c$ of each floating lever has an operative connection with one of the latch bars 79, previously described, as shown in Fig. 4.

The member 134 is arranged to be oscillated by a cam 135 (Fig. 7) on the tabulating cam shaft 33 which coacts with a double cam follower in the form of rollers 136 carried on the member. With the member 134 in its normal rest position as shown in Fig. 7, the arms 132$^b$ of the floating levers engage a fixed stop 137 and thus hold the associated feelers in their upper position against a fixed stop 138. The latch bars 79 are thus held in an intermediate position with their forward ends adjacent but out of engagement with the notches 80 of the respective punch control bars 74 (Fig. 4).

When the control member 134 is rocked in a clockwise direction, as viewed in Figs. 4 and 7, the feelers 131 are moved toward the master tapes. The feelers that do not encounter holes in the tape are blocked by the tape and consequently the associated floating levers 132 are rocked in a counterclockwise direction. The latch bars associated with these floating levers are thereby shifted to the left, as viewed in the above mentioned figures. The feelers 131 which find holes in the master tapes enter such holes and the associated latch bars are held in their retracted position by their individual springs 139. Thus the latch bars 79 are set in a permutational code combination corresponding to the code signal combination selected by the positioning of the master tapes as determined jointly by the control unit and the particular tabulating key actuated to initiate the tabulating cycle. The setting of the latch bars controls the operation of the punch mechanism, as hereinbefore described, whereby the selected signal combination is perforated in the control tape 34.

*Tabulating mechanism control unit*

It will be apparent from the foregoing description that the selecting action of the tabulating numeral selecting mechanism 32 is controlled primarily by the combination bars 83 and 84. These bars, in turn, are operated selectively by the control unit 31 through the medium of the code bars 87. Preferably the control unit is adjustable for different tabular forms so that the machine may be employed in the preparation of any type of tabular composition without structural changes or modifications and without replacement or substitution of parts.

The control unit 31 in its preferred form comprises a suitable recording medium upon which a pattern of the tabular form to be composed may be set up. The recording medium in the present instance consists of a series of pin bars 141 (Figs. 9, 10 and 15) each having settable elements in the form of pins 142 operative when set to control the movements of the code bars 87. These pins are adapted to be set in different permutational combinations to designate the various digit positions in a line at which the tabular columns are to begin and thus effect an appropriate setting of the code bars to select the proper signals for this purpose. One pin bar is employed to represent each tabular column of the form to be composed. Herein thirty-two of the pin bars are shown, providing for a tabular form utilizing a maximum of thirty-two columns. The pin bars not required in any particular composition are rendered inactive temporarily as one step in the process of setting up the pattern of the tabular form.

Referring now to Figs. 9 and 10, each of the pin bars 141 consists of upper and lower plates in the form of flat metal strips 143 and 144 held in parallel spaced relation by suitable spacers 145. The plates are formed with uniformly spaced holes for the reception of the pins 142, the pins being of somewhat greater length than the distance between the outside surfaces of the plates and therefore projecting beyond the plates. The pins are slidable vertically in the holes in the plates and may occupy either of two positions, namely, an upper position, hereinafter called the "non-pushed" position, and a lower position called the "pushed" position. A flat spring 146 interlaced with the pins serves to hold them in either position by frictional engagement.

In the particular embodiment of the invention illustrated, each pin bar is equipped with eight of the pins 142. This provides for a maximum of 256 different permutational signal combinations of which only 192 are used in the present instance, one combination being allocated to each digit position in the line as hereinbefore explained. Any pin bar may therefore be set to designate the initial digit position of any one of the thirty-two tabular columns beginning in any digit position of the line.

The pin bars are supported above the code bars 87 (Fig. 9) for movement transversely thereof whereby the pins 142 may be moved into or out of alinement with the code bars. When the pins of a pin bar are alined with the code bars, the pin bar is in what may be termed the active position and under these conditions, the pins in pushed position enter notches in the associated code bars and hold them in retracted position. The code bars alined with non-pushed pins are not blocked and are therefore permitted to advance at the proper point in the tabulating cycle as will be described in more detail hereinafter. The particular combination in which the code bars are set under control of the pins determines which of the combination bars 83 and 84 shall be effective in positioning the master tapes.

Novel means is provided by which the pins of the pin bars may be quickly and easily set in the desired combinations. As herein shown, this means comprises a pin setting mechanism 147 (Fig. 16) having a series of pin pushers in the form of elongated rods 148, and a cooperating setting plate 149 in the form of a flat metal sheet perforated with rows of holes arranged in the different permutational combinations. The slide 149 as well as the pin bars are supported for movement relative to the pin pushers 148 so that any pin bar may be positioned in operative relation therewith and any row of holes in the plate may be associated with the positioned bar. To this end, the pin bars are supported in a sliding rectangular frame 150 (Fig. 15) hereinafter called the pin bar car, which may be of any suitable construction.

Figure 15:
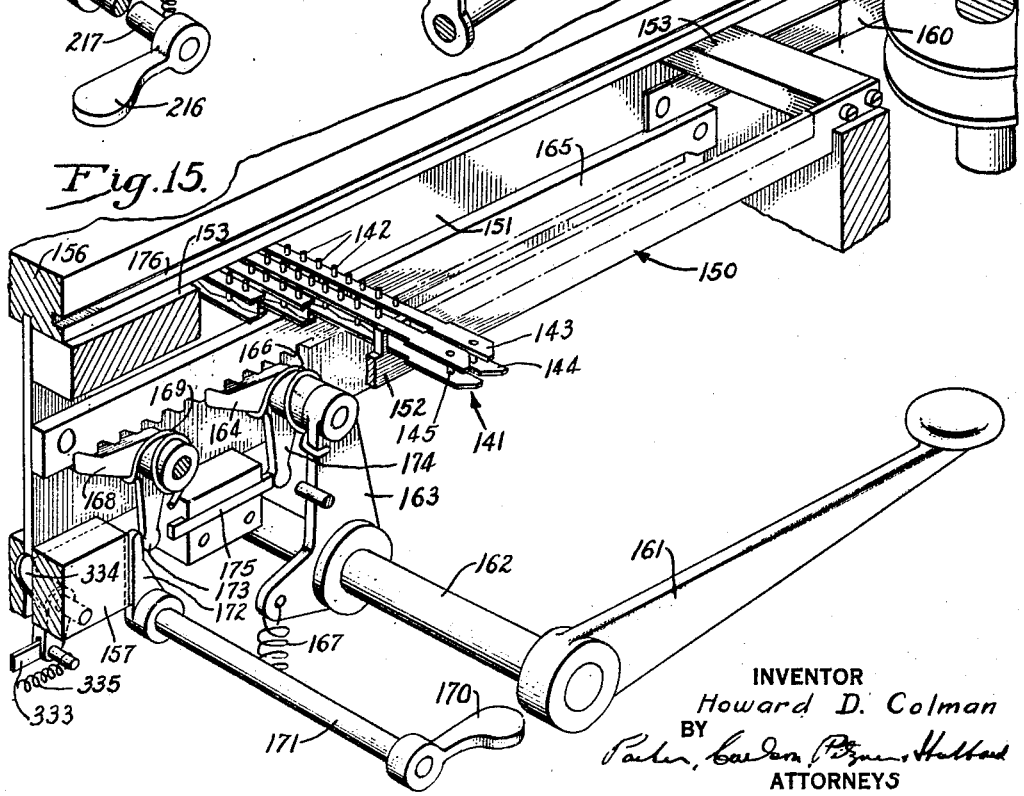
Fig. 15 is a fragmentary perspective view of the control unit including the pin bar supporting car and the means for shifting it to position the pin bars for preliminary setting.

Referring to Figs. 9, 10, 15 and 16, the pin bar car 150 in its preferred form comprises spaced parallel side bars 151 and 152 rigidly connected at opposite ends by end members 153, the bar 151 being relatively wide (Figs. 15 and 16). The side bars 151 and 152 are notched longitudinally of their upper edges to receive the pin bars, there being one set of notches for each pin bar. The plates 143 and 144 of the bars are recessed to define shoulders at each end which limit the sliding movement of the bars. Individual leaf springs 154 (Fig. 16) acting on the pin bars normally urge them to the forward positions in which the shoulder adjacent the rear edge of each plate engages the side bar 151 (Fig. 9).

The pin bar car 150 is supported and guided for endwise movement relative to the pin setting mechanism so that the pin bars may be selectively positioned in operative relation to the pushers 148. To this end, the upper and lower edges of the side bar 151 are arranged to slide in grooves formed in frame members 156 and 157 (Fig. 15), while the side bar 152 slides in a recess 158 formed in a frame member 159 (Fig. 10). A coil spring 160 tends to move the car away from the pin pusher, that is, to the right as viewed in Fig. 15.

Step-by-step movements are imparted to the pin bar car 150 to position the pin bars successively in operative relation to the pin pushers by means of a hand lever 161 which, as will appear presently, also serves to actuate the pin setting mechanism. The hand lever is carried by a rock shaft 162 (Figs. 15 and 16) extending transversely of the car and suitably journaled on the frame of the machine. Fast on the rock shaft is an arm 163 on which is pivoted a pawl 164 engageable with the teeth of a rack 165 rigid with the side bar 151 of the car. A torsion spring 166 holds the pawl in engagement with the teeth of the rack. When the hand lever is depressed, the pawl 164 is shifted rearwardly a distance substantially equal to the space between two teeth of the rack. The spring 166 yields as the pawl slips over the adjacent tooth and then forces the pawl into operative engagement with that tooth. Upon release of the hand lever, a spring 167 acting on the arm 163 draws the arm and pawl forward and thus moves the car one step ahead against the tension of the spring 160.

Reverse movement of the car is prevented by a locking pawl 168 pivoted on the frame of the machine slightly in advance of the pawl 164. A spring 169 normally holds the locking pawl in engagement with the teeth of the rack 165 but permits the teeth to slide by as the car is advanced.

In order to release the car for return to normal position, withdrawal of both pawls from engagement with the rack is necessary. Such withdrawal is effected by means of a hand lever 170 fast on a rock shaft 171 which carries an arm 172 adapted to engage a finger 173 formed integrally with the pawl 168. Interposed between the finger 173 and a similar finger 174 formed on the pawl 164 is a sliding bar 175. When the lever 170 is depressed, the arm 172 rocks the pawl 168 in a counterclockwise direction, as viewed in Fig. 15, and the finger 173 shifts the bar 175 to the right, thereby rocking the pawl 164 on its pivot. Both pawls are thus disengaged from the rack teeth and the car is then returned to normal rest position by the spring 160.

Setting plate

The setting plate 149 provides a convenient means by which the operator may quickly and accurately set the pins of the pin bars in the proper combinations for designating the different positions in the line at which a column may be located. As herein shown, the plate is provided with a series of groups of holes, each group having a different permutational value. In the present instance, the holes in each group are arranged in rows transversely of the plate, the holes being spaced apart so as to aline with the pins 142 of the pin bars and with the pin pushers 148, as shown in Fig. 16. The number of combinations required will vary with the capacity of the machine but, for purpose of illustration, the plate shown is provided with ninety-six combinations based on a seven-unit code. An additional or eighth hole is perforated in line with each of the 96 rows, and the pin pushers associated with this hole is provided with means by which it may be rendered active or inactive at will so that each group of holes may be used twice, once for a seven-hole combination signal and again for an eight-hole combination signal. This provides the 192 different signal combinations required by the machine illustrated.

The setting plate 149 is slidably supported in a horizontal position directly above the pin bars 141 so that it can be shifted between the lower ends of the pin pushers 148 and the pins 142 of the pin bar positioned in operative relation to the pushers. The support is provided by grooves 176 formed in the frame member 156 and a frame member 177 (Figs. 3, 10 and 15) which is rigidly supported on the frame member 159 parallel to the path of the pin bar car. The setting plates can thus be positioned to aline any selected row of holes with the pin pushers.

To facilitate accurate positioning of the setting plate, the frame member 177 is formed with notches 178 (Figs. 1, 3 and 16) along one edge for the reception of a spring-pressed plunger 179 (Fig. 3) carried on the plate. The notches 178, of which there are ninety-six in the present instance, are spaced apart the same distance as the rows of holes in the setting plate. As a matter of convenience they are identified by two sets of members, one set being the members 1 to 96, th other the numbers 97 to 192. These are used to locate the plate for selection of seven-unit combinations and eight-unit combinations, respectively. To shift the setting plate, the plunger 179 is withdrawn from the notch by means of a hand operator 180, which is then utilized to move the plate in either direction between the two extreme positions, representing respectively the first position in the line and the last position in the line.

Pin setting mechanism

As shown in Fig. 16, the pin pushers 148 for setting the pins of the pin bars are carried by a slide 181 supported in a frame 182 above the left end of the pin bar car 150 for movement toward and from the car. The pushers are supported and guided at their upper ends in recesses in the cross member of the slide 181 and at intermediate points by a guide plate 183 mounted on the slide and a stationary guide plate 184 mounted on the frame of the machine. Each pusher has a collar 185 engageable with the guide plate 183, and a coiled compression spring 186 interposed between the slide and the collar serves to hold the pusher in a lower position with the collar in engagement with the guide plate.

Suitable means, such as a spring 187, is provided for holding the slide 181 in a raised position with the lower ends of the pushers 148 withdrawn from the plane of the setting plate 149. When the slide 181 is moved downwardly, the pushers 148 are advanced toward the setting plate and the pins 142 of the pin bar positioned in operative relation to the pusher. The pushers that register with holes in the setting plate pass through and engage the corresponding pins 142 of the pin bar. The tension of the springs 186 is sufficient to enable the pushers to force the engaged pin into its lower or pushed position. The pushers 148 which do not register with holes in the setting tape are blocked by the tape and forced into their recesses against the action of their associated springs 186. As a result, the pins 142 corresponding to the blocked positions remain in their upper or non-pushed position while the other pins are operated to pushed position, thus setting up the signal combination on the pin bar corresponding to the selected combination of the setting plate.

Any suitable means may be employed for depressing the slide 181 to set the pins of the pin bars. As herein shown, the depression of the slide is effected by the hand lever 161 which, as previously described, is utilized to advance the pin bar car step by step to position the pin bars for setting. To this end, an arm 188 is secured to the shaft 162 which carries the hand lever. The arm 188 (Figs. 1 and 16) is connected by a link 189 with an arm 190 fast on a shaft 191 journaled in the frame 182 above and to the rear of the slide 181. An arm 192 fast on the shaft 191 carries a roller 193 engageable with the slide, the arm being operative to depress the slide when the hand lever is operated. Thus, the pins 142 of the pin bars are set as an incident to the conditioning of the mechanism for advancing the pin bar car a step.

It is contemplated that the signal combinations in the setting plate are to be used twice, that is, once to select seven hole combination signals representing the digit positions in the first half of a line, and again to select eight-unit signals representing the digit positions in the last half of the line. Means is therefore provided for rendering the pusher 148 in the eighth position ineffective when selecting signals for the first half of the line. As shown in Fig. 16, the recess for this pusher is extended entirely through the slide 181 and the pusher is made of sufficient length to project above the slide. The projecting end of the pusher terminates in a knob 194 below which is located a collar 195 engageable with a pivoted latch 196. To render the pusher inactive, it is raised by means of the knob 194 and the latch 196 is swung below the collar 195 to hold the pusher in raised position. With the pusher thus latched, the eighth pin of the pin bar remains in non-pushed position when the other pins are set. When the latch is released, the eighth pusher operates in exactly the same manner as the other pushers.

Means is provided for blanking the pins of the pin bars before presenting them to the setting mechanism. This means as shown in Figs. 10 and 16 comprises a blanker in the form of a flat plate 197 slidably supported below the control car and spaced rearwardly of the pin pushers by a distance corresponding to the spacing between adjacent pin bars. The upper edge of the blanker plate is notched as at 198 to provide clearance for the code bars 87, and the lugs thus formed are effective to engage the lower ends of the pushed pins when the blanker plate is moved upwardly. Such movement is imparted to the plate by an arm 199 fast on the shaft 162 which engages in a notch 200 in the lower end of the blanker plate. Thus, the actuation of the hand lever 161 to advance the pin bar car and to operate the pin setting mechanism also serves to blank the pins prior to their presentation to the setting mechanism for resetting in a new combination.

The normal retracted position of the pin bar car 150 is such that the first pin bar of the group is disposed in operative relation to the blanker plate 197 and thus one step to the left of the pin pushers. Upon the first depression of the hand lever 161, the pins of the first bar of the group are therefore blanked while the pin pushers are depressed but perform no useful function. Upon release of the hand lever, the pin bar car is advanced one step as hereinbefore described, thereby positioning the first pin bar in pin setting position with its pins all in non-pushed position due to the action of the blanker plate. In the next depression of the hand lever, the pins of the first pin bar are set in the combination determined by the setting slide 149 and the pins of the second pin bar are blanked. This cycle of operation is repeated until a pin bar has been set for each column to appear in the finished copy.

Pin bar lock-out

Since only one pin bar is required for each column of the tabular matter to be composed, the pin bars in excess of those required for a particular tabular form are rendered inoperative by locking them in a retracted position in which the pins 142 are positioned between the code bars 87 and therefore ineffective to control the bars. The means provided for this purpose preferably comprises a column slide 201 (Figs. 9 and 10) supported on horizontal guideways in the frame of the machine for movement transversely of the pin bars and engageable with the forwardly projecting ends of the top plates 143 of the bars. The plates 143 and one end of the slide 201 are suitably beveled so that the slide in moving to the left as viewed in Fig. 9, cams the pin bars back successively. The forward edge of the cam plate serves thereafter to hold the bars in their retracted positions.

As shown in Fig. 10, the slide 201 is in the form of an angle and is supported by a gib 202 carried on the depending leg. The gib engages in a T-slot 203 formed in a stationary member 204 of the frame of the machine. Mounted on the top of the slide is a detent 205 in the form of a headed, vertically slidable pin adapted to enter holes drilled in the frame member 204. The pitch of the holes corresponds to the spacing of the pin bars so that the slide may be locked in position to engage any desired number of the bars. A scale 206 (Fig. 1) on the top surface of the frame member 204 provides a visual indication of the number of pin bars left in active position by the slide.

Pin bar shifting

When the pin bars 141 are in either extreme forward or retracted position, the pins 142 are positioned between the code bars 87 and are thus ineffective to control the movement of the code bars. In order to render a pin bar effective, it must be shifted to intermediate position in which the pins are in alinement with the respective code bars.

Means is provided for shifting one of the pin bars into its operative position with respect to the code bars in each tabulating cycle. This means is so arranged that the pin bars are shifted one by one in succession in response to successive operations of the tabulating keys. Thus the control unit is enabled to control the selective positioning of the master tapes 81 and 82 to select the tabulating numeral signal for each column of the composition.

In the preferred form shown in Figs. 10 to 14, the means for shifting the pin bars to active position comprises a chain 210 composed of a series of links 211 each of which carries a single pin 212 slidable between the retracted and advanced positions shown respectively in solid and broken lines in Fig. 12. A flat spring 212' frictionally engages the side of each pin to hold it in either position. The chain is carried on sprocket wheels 213 and 214 (Figs. 12 and 14) with its upper run operating in a guideway formed by grooves 213ª in the frame members 159 and 204 (Fig. 10). The pins of the chain are thus positioned immediately below the projecting forward ends of the pin bars, the arrangement being such that a pin 212 when in advanced or pushed position is adapted to engage the lower plates 144 of the pin bars.

The ends of the plates 144 are beveled as shown in Figs. 9 and 15, so that upon movement of the pin chain, the pin bars are cammed rearwardly until the pins 142 are alined with the code bars 87. The pushed pins 142 of such pin bars are thus operative to block the associated code bar against movement.

To condition the pin chain for action, the previously set pin is restored to normal or non-pushed position by means of a cam 215 carried on the underside of the column slide 201 (Figs. 9, 10 and 14). Blanking of the pins is accomplished by shifting the slide to its extreme left position, an operation which the operator normally will perform in setting up the machine for composition of tabular matter. After the pins are blanked, the slide is returned to the desired pin bar selecting position, as previously described.

To condition the pin chain for operation, the pin 212 located next to the left of the first pin bar 141 is initially pushed into operative position by actuation of a hand lever 216 (Figs. 1 and 14) carried on a rock shaft 217 and operatively connected with a pusher arm 218 engageable with the lower end of the pin. The operative connection between the hand lever and the pusher arm as herein shown is provided by an arm 219 fast on the rock shaft 217 which is connected by a link 220 with one arm of a bell crank 221 fast on a shaft 222 extending beneath and transversely of the upper run of the chain. The shaft carries the pusher arm 218 and when rocked by depression of the hand lever 216 it moves the arm into engagement with the pin 212 at the desired location. A spring 221ª connected between the frame of the machine and the bell crank 221 returns the pusher to normal position when the hand lever is released, while a spring 222ª serves to restore the hand lever. As herein shown, a pin and slot connection is provided between the link 220 and the bell crank 221 to permit operation of the pusher arm 218 independently of the hand lever 216 as will be described hereinafter.

Means is provided for advancing the pin chain step by step to enable the pushed pin 212 to engage the pin bars and shift them into operative position in succession as the tabulating keys are operated to designate successive columns of the composition. In order to properly coordinate the action of the pin chain with the other operations of the machine, the chain advancing mechanism is preferably in the form of a Geneva stop motion including a driving member 223 (Fig. 19) fast on the tabulating cam shaft 33 and a driven member 224 carried by a shaft 225. The shaft 225 is drivingly connected with the sprocket wheels 214 through the medium of full-toothed spur gears 226 and 227, shaft 228, bevel gears 229 and 230, shaft 231, bevel gears 232 and 233, a shaft 234, a one-way drive device 235, and a shaft 236 to which the sprocket wheels 214 are keyed. The gear ratio is such that in each tabulating cycle, that is, for each revolution of the tabulating cam shaft, the chain is advanced one step.

The one-way drive device 235 is interposed between the shafts 234 and 236 to permit manual advancement of the pin chain when it is desired to skip a column. As herein shown, the device comprises a spring-pressed pawl 237 pivoted on an arm 238 fast on the shaft 234, the pawl being engageable with the teeth of a ratchet wheel 239 fast on the shaft 236. The shaft 236 carries on its forward end a handwheel or knob 240 by which it may be rotated manually to advance the pin chain independently of the shaft 234.

The step-by-step movements of the pin chain above described render the set pin bars 141 effective successively to control the code bar 87 governing the selective movement of the combination bars 83 and 84 (Fig. 7) in the operation of selecting signals representing the successive tabular columns.

When the set pin 212 of the pin chain passes the last set pin bar upon selection of the signal for the last column of the tabular form, the pin is blanked or returned to normal or non-pushed position by the cam 215 which is automatically positioned to effect this operation at the proper time when the column slide is set manually to select the active pin bars.

In order to reoperate the pin bars for composition of the succeeding line in the same tabular form, means is provided for automatically setting another pin in the pin chain immediately prior to the blanking of the first mentioned pushed pin 212. To this end, a slide bar 241 (Figs. 9, 10 and 14) is mounted on the underside of the setting slide 201 in a position such that it is engaged by the pushed pin 212 in its movement from the last active pin bar to the cam 215. The beveled inner end of the slide bar 241 lies in the path of the pins 212 so that in the movement of the chain, the pin operates to cam the bar to the right as viewed in Fig. 10.

When moved to the right as above described, the bar 241 engages a bail 242 and rocks a shaft 243 (Figs. 10 and 14) which supports the bail. The shaft carries an arm 244 supporting at its rearward or free end a push rod 245 pivoted on a crank arm 246 fast on a rock shaft 247. The push rod 245 is operated through a forward and return stroke in each tabulating cycle of the machine by means of a cam 248 (Fig. 1) on the tabulating cam shaft 33 through the medium of a pivoted cam follower 249 which is connected by a link 250 with an arm 251 fast on the rock shaft 247. The shaft is thus oscillated incident to the rotation of the tabulating cam shaft, and through the arm 246 imparts a forward and return stroke to the push rod 245.

When the bail 242 is operated by the bar 241 in the manner above described, the arm 244 raises the free end of the push rod into the path of a depending arm 252 of the bell crank 221 which, as previously explained, is mounted on the pin pusher rock shaft 222. The push rod is thus rendered effective to rock the pin pusher 218 into operated position to push up the pin 212 of the link located immediately ahead of the first pin bar. The hand lever 216 is held in normal position by the spring 222a during this operation, the pin and slot connection between the link 220 and the bell crank 221 permitting independent movement of the pusher.

Operation of the control unit

Referring to Fig. 16 the code bars 87 are normally held in an advanced position against the tension of individual springs 253 by a bail 254 carried on the rock shaft 247. When this shaft is rocked by the cam on the tabulating cam shaft as above explained, the bail 254 is withdrawn thereby releasing the code bars 87 to the control of the set pin bar in active position. The code bars which are not blocked by pushed pins of the pin bar are accordingly retracted by their respective springs 253, while the remaining code bars are held in normal position by the pushed pins.

The code bars 87 are notched along their lower edges (Fig. 7) for cooperation with the combination bars 83 and 84 which control the setting of the master tapes 81 and 82. The combination bars are held out of engagement with the code bars by the bail 85 until the code bars have been positioned. The bail is then withdrawn to release the combination bars, such withdrawal being effected by a cam 255 (Fig. 1) on the tabulating cam shaft 33 acting through a follower 256 to which is pivoted a vertically movable bar 257 (Fig. 7) having rack teeth engaging a pinion 258 rigid with the bail shaft 85a.

Keyboard mechanism

The keyboard 44 and selective mechanism associated therewith may be substantially the same as that disclosed in my copending application above mentioned, except for the addition of the tabulating keys 35 to 39 and the tabulating apparatus associated therewith. Briefly, it comprises (Figs. 2 and 17) a group of character keys representing letters, figures, punctuation marks, spaces, etc. and a group of function keys such as shift keys, font selecting keys and the tabulating keys 35 to 39 above mentioned.

As hereinafter described under the heading "cycle control," the depression of any of the character keys or function keys serves to initiate an operating cycle of the machine by tripping the main clutch 48; and the tabulating keys act additionally to trip the tabulating cam shaft clutch 49. Moreover each of the keys is operative to position a codal element or flag in the performance of its particular selective operation. As shown in Fig. 17, each of the keys has a stem 261 engageable with one arm of a pivoted bell crank lever 262. The other arm of the bell crank is operative through an intermediate member or key return bar 263 to shift a codal element in the form of a notched bar or flag. The flags for the character keys are designated by the reference numeral 76 and the tabulating key flags by the reference character 265. Individual leaf springs 266 acting on the bars 263 hold the keys in their normal elevated position.

The character key flags 76 are notched longitudinally of their upper edges and serve to control in well known manner the operation of transversely disposed permutation elements including the control bars 75 which, as previously explained, control the operation of the perforating and printing mechanisms. As will be seen by reference to Fig. 21, the control bars 75 are normally held in a retracted position by a bail 267 carried on a rock shaft 268 extending transversely of the control bars. Any suitable means such as a cam (not shown) on the main cam shaft 47 may be utilized to rock the shaft 268 and thus withdraw the bail from engagement with the control bars. When so released, the control bars are advanced by their individual springs 75' until blocked by an operated flag 76. The bars not blocked by the flag execute a full stroke whereby the notches 78 are moved out of the path of the punch feeler bars 74 (Fig. 4) to control the operation of the punches 51 as hereinbefore described.

The tabulating key flags 265 have no individual coaction with the control bars 75 but control the bars selectively through the medium of the common tabulating signal flag 77 which is suitably notched so that when operated, it releases the control bars in a predetermined combination representing the tabulating signal. The flag 77 is arranged to be operated upon the depression of any one of the tabulating keys 35–39. To this end, there is provided a rock shaft 272 having rigid fingers 273 engaging in notches 274 in the key return bars 263 of the respective tabulating keys. The shaft also has a finger 275 engaging in a notch in the flag 77. The notches 274 are of substantial width so that the keys may be restored to normal position while the tabulating flag remains in operated position.

The tabulating flag 77 is returned to normal position by positively acting, power driven means to avoid any possibility of interference with the operation of the tabulating mechanism due to the operator's prolonging the depression of a tabulating key. As herein shown, the restoring means includes a cam 276 on the tabulating cam shaft 33 acting through a cam follower 277 carried on one arm of a pivoted lever 278. The other arm of the lever is connected by a link 279 with a crank arm 280 fast on a rock shaft 281 which has a rigid finger 282 engaging in a notch in the tabulating signal flag 77.

The tabulating key flags 265 are arranged to cooperate with the digit positioner slide bar 116 (Fig. 7) in effecting a supplemental setting of the master tapes as hereinbefore described. As will be seen by reference to Fig. 17, the bar 116 has a notch for each of the flags 265. The notches differ in width progressively from left to right, and when one of the flags 265 is advanced by the depression of its associated key, it enters the notch and thereby determines the extent of movement permitted to the positioner bar. In the particular embodiment shown, the notch in the positioner bar for the flag of the first digit position tabulating key 35 is just of sufficient width to provide clearance for the flag so that substantially no movement of the positioner bar is permitted when the key 35 is depressed. The remaining notches are formed so that the positioner bar is permitted to move a step of one-unit length when the second digit position key 36 is depressed, a two-unit step when the third digit position key 37 is depressed, a three-unit step when the fourth digit position key 38 is depressed, and a four-unit step when the fourth digit or decimal position key 39 is depressed. These varying movements of the positioner bar 116 are utilized to effect the supplemental setting of the master tapes 81 and 82 to select appropriate tabulating numeral signals for different digit positions of the column as above set forth.

Cycle control

Means is provided for initiating an ordinary operating cycle of the machine in response to the depression of a character key and for initiating a tabulating cycle in response to the depression of any one of the tabulating keys. To this end, the character key flags 76 are extended to the rear of the machine into operative association with means for tripping the main clutch 48 to initiate an ordinary operating cycle. This means is of such character that the operation is invariably limited to a single revolution of the main shaft for each key actuation. The clutch tripping means comprises a pivoted segment 286 (Fig. 21) for each flag 76. The segments are operative upon the depression of the associated key to engage a bail 287 and thereby rock a shaft 288 which carries a finger 289 cooperating with a pair of spaced spring latches 290 and 291.

As herein shown, the latch 290 is normally positioned in blocking relation to one arm of a pivoted bell crank lever 292 having its other arm operatively connected with a release bar 293. Upon withdrawal of the latch 290 incident to the operation of the bail 287, the lever 292 is rocked about its pivot by a spring 294 and shifts the release bar 293 rearwardly as viewed in Fig. 21, or to the right as viewed in Fig. 19, to trip the clutch 48.

As hereinbefore indicated, the clutch 48 is of the friction type and may be similar in construction to the clutch shown in my prior Patent No. 1,962,136, of June 12, 1934. It includes driving and driven elements, the former connected by a full-toothed gear 295 (Figs. 1 and 19) with the driving motor M and the latter connected with the main drive shaft 46. The control element for this clutch is in the form of a finger 296 rotatable with the driven element. When the finger 296 is blocked against rotation, the driving and driven elements of the clutch are disengaged and the drive shaft 46 is held stationary.

As herein shown (Fig. 19), the clutch finger 296 is blocked by means of a detent in the form of a bar 297 pivoted on an arm 298 of a bell crank whose other arm 299 engages in a notch formed in the upper edge of release bar 293. With this arrangement, the movement of the release bar incident to the depression of a key is effective to withdraw the detent 297 and render the clutch 48 effective to drive the main shaft through a single operating cycle which, in this case, comprises a single revolution. Upon completion of the operating cycle, the release bar is returned to normal position and the detent is again positioned to block the clutch finger 296 by suitable cam operated restoring means (not shown). If the key which initiated the operating cycle has been released, the latch 290 again engages the bell crank 292 and holds the release bar in retracted position. If the key should be held depressed, the auxiliary latch 291 occupies a position such as to block the bell crank 292 and thus prevent an additional operating cycle.

Means is also provided for tripping the main clutch 48 as well as the tabulating cam shaft clutch 49 upon the depression of any one of the tabulating keys. This means includes a pivoted segment 300 (Fig. 17) similar to the segments 286 and alined therewith for engagement with the bail 287. The segment 300 is operatively associated with the tabulating signal flag 77 so that the segment is rocked into engagement with the bail 287 and trips the clutch 48 upon the depression of any one of the tabulating keys 35—39.

The tabulating signal flag 77 also operates to trip the tabulating cam shaft clutch 49 upon the depression of a tabulating key. This clutch may be of any suitable construction but is preferably of the positive acting type. As herein shown, it comprises a driving element 301 (Fig. 19) and a driven element 302, the former being driven through an idler gear 303 by a pinion 304 on the main drive shaft 46 the gears and pinions in this instance being full-toothed. The driven element 302 is fast on the tabulating cam shaft 33 and is provided with a finger 305 which, when blocked against rotation, holds the driving and driven elements of the clutch disengaged and thus prevents rotation of the tabulating cam shaft.

As herein shown (Fig. 19), the means for blocking the clutch finger 305 comprises a detent in the form of a pivoted bell crank having one arm 306 normally positioned in the path of the clutch finger. The other arm 307 of the bell crank is connected by a link 308 with an arm 309 fast on a rock shaft 310 extending over and transversely of the release bar 293. Fast on the other end of the shaft 310 is a depending arm 311 to which is pivoted a push rod 312 adapted to be moved into or out of the path of an upstanding lug 313 on the release bar 293.

The push rod 312 is normally held in an inoperative position above the lug 313 by an operating member in the form of a bell crank having one arm 314 slotted to receive the free end of the push rod and another arm 315 engaging in a slot in the tabulating signal flag 77 (Figs. 17 and 19). The arrangement is of such character that upon movement of the flag 77 incident to the depression of a tabulating key, push rod 312 is dropped into the path of the lug 313. At the same time, the flag 77 acting through the segment 300 and bail 287 trips the latch 290 to permit movement of the release bar 293 for tripping the clutch 48. In this movement of the release bar, the lug 313 engages the push rod and rocks the detent 306 out of the path of the clutch finger 305, thereby initiating an operating cycle of the tabulating cam shaft.

As hereinbefore explained, the tabulating cycle is equivalent to four ordinary or normal operating cycles of the main cam shaft and it is therefore necessary to operate the latter through what may be termed an abnormal cycle, that is, through a plurality of successive normal cycles in order to enable the tabulating cam shaft to complete its cycle. Accordingly, the gear ratio of the tabulating cam shaft driving gears is such that the tabulating cam shaft makes one complete revolution or operating cycle to each four operating cycles of the main drive shaft 46. The first operating cycle of the main drive shaft is initiated by the depression of a tabulating key, as above described, and in this cycle the tabulating cam shaft is operated through the first quarter of its operating cycle. The second, third and fourth operating cycles of the main drive shaft, necessary to operate the tabulating cam shaft through the remaining three quarters of its cycle, are initiated automatically.

The means for automatically initiating the second and third operating cycles of the main drive shaft 46 comprises a cam 316 (Fig. 18) on the tabulating cam shaft 33 which engages a follower 317 carried on one arm of a bell crank 318 loosely mounted on a shaft 319. The other arm of the bell crank is connected by a link 320 with one arm of a bell crank 321 whose other arm engages in a slot in a bar 322 (Figs. 1 and 8), hereinafter termed the tabulating release bar. The bar 322 is supported in the same plane with and parallel to the flags 76, 77 and 265. It is formed at its rear end with an upwardly projecting finger terminating in a triangular-shaped rearwardly facing lug 323 (Fig. 18) adapted to be projected between the latches 290 and 291 to cam the latches out of the path of the bell crank 292 and thus trip the main clutch 48. The cam 316 is so formed that the shifting of the bar 322 takes place just prior to the completion of the initial operating cycle of the main drive shaft and the bar remains in operated position until the third cycle is substantially completed so that the main drive shaft executes two additional complete cycles or revolutions to drive the tabulating cam shaft through the second and third quarters of its operating cycle without interruption.

The fourth operating cycle of the main drive shaft is initiated automatically by a bar 324 (Figs. 1 and 18) hereinafter called the tabulating numeral release bar, positioned adjacent the tabulating release bar 322 and, like that bar, having a projecting lug 325 adapted to cam the latches 290 and 291 apart when the bar is shifted rearwardly. This shifting is effected by a cam 326 on the tabulating cam shaft through the medium of a follower 327 carried on one arm of a bell crank 328 loosely mounted on the shaft 319. The other arm of the bell crank 328 is connected by a link 329 with one arm of a bell crank 330 whose other arm engages in a notch in the bar 324. The cam 326 is formed so that the bar 324 is shifted into operated position just prior to the completion of the third operating cycle of the main shaft, and thereby automatically initiates the fourth operating cycle of that shaft to drive the tabulating cam shaft through the last quarter of its operating cycle.

In addition to tripping the main clutch 48, the bars 322 and 324 also function as flags to control the movements of the control bars 75. Preferably, the bar 322, when operated, blocks all of the control bars 75 against movement thereby preventing operation of the perforating and printing mechanisms during the second and third cycles of the main drive shaft in the tabulating cycle. It also blocks an auxiliary control bar 331 (Fig. 18) to temporarily interrupt the operation of the printing mechanism and an auxiliary control bar 332 which, through mechanism to be described hereinafter, disengages the tape feed mechanism so that the control tape is not advanced during the second and third cycles of the main shaft. Thus the tabulating signal and tabulating numeral signal are perforated in the tape without intervening blank spaces, thereby avoiding waste of tape and eliminating loss of time through idle cycling of the tabulating machine controlled by the tape.

Flag locking

In order to insure proper recordation of signals and to prevent premature actuation of the character or tabulating keys, means is provided for locking the various flags in either normal or operated position under certain conditions. For example, all flags are locked in an inoperative position while the tabulating mechanism is being set. This is done in the present instance by means of a locking bar 333 (Fig. 17) suitably notched so as not to interfere with the movements of the flags while in normal position. As shown in Figs. 15 and 17, the locking bar is operatively connected to one arm of a bell crank lever 334 pivoted on the frame of the machine adjacent the forward end of the pin bar car 150 (Fig. 15). The other arm of the lever is arranged to be engaged by the side member 151 of the car upon forward movement of the car to position the pin bars in operative relation to the pin pushers 148 of the setting mechanism. Such engagement rocks the arm and moves the bar 333 into locking relation to all of the flags. A spring 335 retracts the locking bar and releases the flags when the pin bar car is returned to normal position after completion of the setting operation.

The character key flags 76 and tabulating signal flag 77 when operated, are locked in advanced position and the flags of unoperated keys are locked in inoperative position in the normal operating cycle of the main shaft. This locking is effected by a locking bar 336 (Fig. 21) extending over and transversely of the key flags. The bar 336 is notched along one edge for cooperation with lugs 337 on the segments 286 and 300, the lugs passing through the notches when the segments are rocked with the bar 336 in normal position. Upon movement of the bar into locking position, the notches are moved out of the paths of the segments so that an operated segment and its associated flag is held in operated position while all other segments are blocked against movement. Movement of the bar 336 to locking position is effected simultaneously with the shifting of the release bar 293, the locking bar having a lug and notch connection with the release bar detent 292 as shown in Figs. 18 and 21.

In the tabulating cycle, the tabulating signal is perforated in the control tape in the first operating cycle of the main shaft while the tabulating numeral signal is perforated in the fourth cycle of the main shaft, as hereinbefore explained. It is therefore necessary to hold the tabulating key flags 265 in operated position during the intervening cycles so that they can perform their supplemental control functions at the proper time. Means is therefore provided for locking these flags in operated position under control of the tabulating cam shaft. This means, as herein shown, comprises a locking bar 338 (Figs. 2, 7 and 17) suitably notched for cooperation with the flags 265. Movement of the bar 338 between locking and non-locking positions is effected by bell crank lever 339 (Fig. 7) having one arm engaging in a notch in the upper edge of the bar. The other arm of the bell crank is connected by a link 340 (Figs. 1 and 7) with the cam follower 129a which is rocked by the cam 129 on the tabulating cam shaft, as hereinbefore explained.

Printing mechanism

The proof printing mechanism 42 may be of any suitable character. The mechanism shown by way of illustration is similar to that disclosed and claimed in my copending application Serial No. 62,742, now Patent No. 2,196,354, issued April 9, 1940. Apart from the control thereof in combination with the tabulating mechanism, such printing mechanism forms no part of the present invention. Accordingly, it is deemed unnecessary to describe it in detail.

Figure 22:
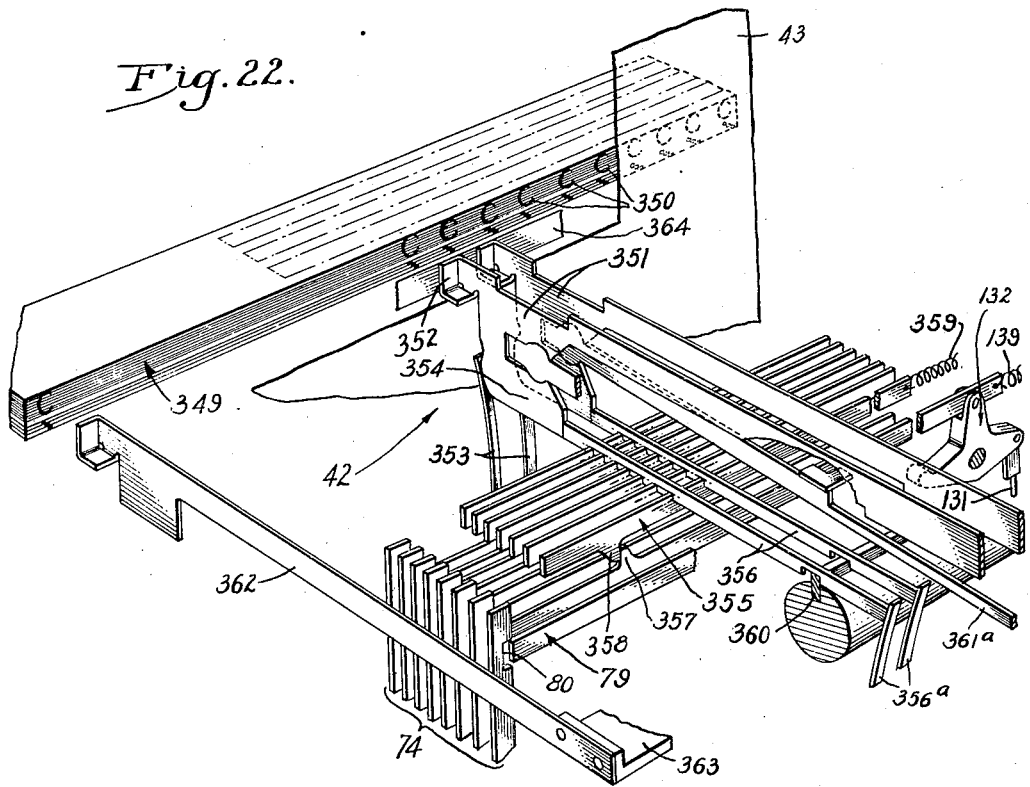
Fig. 22 is a fragmentary perspective view showing details of the proof printing mechanism.

Referring to Figs. 21 and 22, provision is preferably made for the preparation simultaneously with the perforation of character and function signals in the control tape of a proof sheet of the composed matter and also an individual signal proof on the control tape. As shown, the printing mechanism is controlled by a group of code bars 341 (Fig. 21) each operatively connected with one of the control bars 75 and movable therewith when the control bars are released selectively by the depression of one of the character keys. The operative connection between the bars is in the form of a bell crank comprising a vertical rock shaft 342 having oppositely extending arms 343 and 344 engaging in notches formed in the edges of the respective bars.

The selection of the character to be printed on the proof sheet 43 is determined by the setting of the code bars 341. To this end, the code bars are suitably notched for cooperation with a series of combination bars 345, the arrangement being such that a different combination bar is selected for each permutational combination in which the code bars are set. The combination bars are normally held in a raised position by a bail 346 which is withdrawn in well known manner when the code bars are set. Upon withdrawal of the bail, the selected combination bar is advanced through a full stroke by its associated spring 347, the remaining combination bars being blocked against movement by the code bars.

The movement of the combination bars 345 above described may be utilized in any well known way to effect the printing of the selected characters in page form. As herein shown, each of the bars 345 has secured to its upper end a drawbar 348 (Fig. 21) operative to shift the individual strips of a printing head or type pack 349 (Fig. 22) to aline the character delineating elements 350 in the outline of the character to be printed in the manner set forth in said copending application.

In a printing mechanism of the type under consideration, impression of the selected character on the paper or other medium to be printed is effected by means of an impression element or anvil 351 (Fig. 22), one of which is provided for each character position in the line. The anvils are in the form of elongated flat metal strips having impression heads 352 at their rear ends and are supported for endwise movement toward and from the printing head. Individual leaf springs 353 engaging depending, forwardly offset portions 354 of the anvils normally urge the anvils forwardly, that is, away from the printing head.

Suitable actuating means is provided for moving the anvils into engagement with the impression receiving medium one by one in either forward or backward progression. To place any selected anvil under the control of the actuating mechanism, it is necessary to move it rearwardly from normal rest position. This may be done manually, as explained in the above mentioned prior application, or automatically under control of the tabulating mechanism. As shown in Fig. 22, the anvil selecting mechanism comprises a group of code bars 355, hereinafter called the anvil code bars arranged to cooperate with combination bars 356 individual to the respective anvils. The code and combination bars are suitably notched so that one of the latter bars is selected for each setting of the code bars.

Figure 22A:
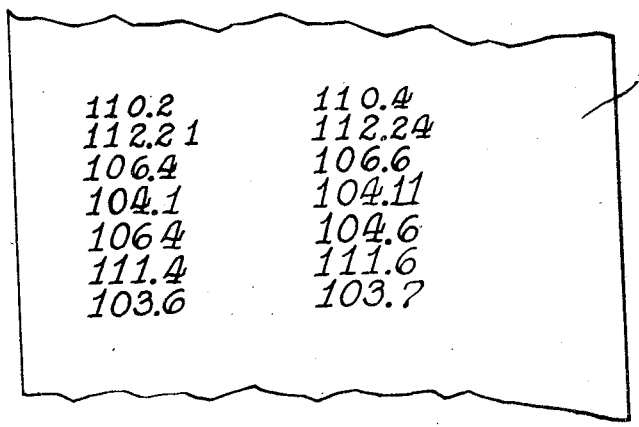
Fig. 22a shows a section of a proof sheet containing tabular matter.

In the composition of tabular matter, such as that shown by way of illustration in Fig. 22a, it is necessary to select the anvil for effecting printing on the proof sheet in the same relative position in the line at which the tabular column appears in the final copy. Accordingly, the anvil code bars 355 are operatively associated with the latch bars 79 of the tabulating mechanism which, as previously described, are set in a predetermined combination to control the punch control bars 74 for selecting the tabulating numeral signal. As herein shown, each latch bar 79 is formed with an upwardly projecting lug 357 operative in the forward movement of the bar to engage a depending lug 358 on the associated code bar and thereby shift the code bar into operated position against its spring 359. Since the latch bars are set in accordance with a combination representing a predetermined digit position in the line, the code bars are likewise set in this combination and select the anvil for printing in the predetermined position.

The combination bars are normally held in a retracted position by a bail 360 adapted to be withdrawn in any suitable manner following the setting of the code bars 355. Upon withdrawal of the bail, the selected combination is moved rearwardly by its individual spring 356$^a$ and, in this movement, engages the depending portion 354 of the associated anvil to shift the anvil into active position. The anvil, when in active position is operatively associated with a reciprocating member 361 (Fig. 2) conveniently termed the anvil carriage, which moves the anvil rearwardly to printing position. The movement of the one anvil to printing position automatically conditions one of the adjacent anvils for printing by moving such anvil into active position. The particular anvil rendered active depends upon the positioning of a progression control arm 361$^a$ (Fig. 22). When the arm is shifted to the right, progression is from left to right, the progression being reversed when the arm is shifted to the left.

Since the proof sheet is used primarily for the guidance of the operator, it is unnecessary to arrange the type with varying set widths as is done in the final printing. The type pack is therefore arranged to provide uniform spacing for all characters and numerals. This makes it impractical to divide the line into digit positions of one-half em width. Accordingly, the proof sheet is divided into 96 full width digit positions and, where a line of the final copy exceeds 96 one-half em digit positions in length, it is spread over two lines on the proof sheet.

To this end, code bars 355 are provided only for the first seven latch bars 79 while the eighth latch bar is arranged to operate the line feed mechanism for advancing the proof sheet. As explained hereinbefore, seven-unit code signals are employed to designate the first 96 positions in the line while the same signal combinations, with the addition of the eighth hole, are allocated to the last 96 positions of the line. Thus, when an eight-unit signal is selected by the tabulating mechanism, the eighth latch bar 79 is operated and initiates the line feed operation. The other seven latch bars and their associated code bars 355 operate in the usual way to select the line position.

To provide for the printing on the control tape 34 of characters representative of the individual signals, the type pack 349 is extended so as to overlie the lower edge of the control tape as shown in Figs. 4 and 6 so as to simultaneously print a selected character on the proof sheet 43 and on the control tape 34.

Impression of the selected character on the control tape 34 is effected by an impression element or anvil 362 (Fig. 22). This anvil is generally similar in construction to the anvils 351 but is rigidly connected with a bracket 363 fast on the anvil carriage 361 (Fig. 2) which operates the anvil to print in each operating cycle of the main shaft. As will be seen by reference to Fig. 6, the anvil 362 is positioned with its impression head just below the row of punches 51. An inked ribbon 364 is fed between the impression head and the control tape by rollers 365.

Control-tape feed

As previously stated, the tape feed mechanism is arranged to remain inactive during a predetermined portion of the tabulating cycle. The means employed for rendering this mechanism inactive is also utilized for reversing the direction in which the tape is fed as, for example, when it is necessary to cancel or "rub out" certain of the signals previously recorded on or in the control tape. The feed mechanism is further arranged to advance the tape step-by-step with uniform acceleration and deceleration, thereby permitting high speed operation without danger of damaging the tape.

Referring to Fig. 20, the control tape 34 is fed either forwardly or backwardly by rotation of the feed roller 56 which is preferably formed with sprocket teeth engaging the usual feed holes 371 in the tape. As hereinshown, the roller 56 is mounted on a vertical shaft 372 which has a bevel gear 373 meshing with a bevel gear 374 fast on a horizontal shaft 375. The shaft 375, in turn, has a bevel gear 376 meshing with a bevel gear 377 carried on the upper end of a vertical shaft 378 which carries on its lower end a bevel gear 379 meshing with a bevel gear 380 fast on a short, horizontal shaft 381. The shaft 381 is axially alined with a cyclically driven shaft 382 and is adapted to be connected with and disconnected therefrom by a clutch element 384 in the form of a sleeve having a splined connection with the shaft 381.

The clutch element is formed at one end with a tongue 385 and at the other end with a tongue 386. When the element is moved rearwardly as viewed in Fig. 20, the tongue 385 engages in a slot in the face of a gear 387 rigid with the shaft 382, thus completing a direct driving connection between the two shafts.

Upon movement of the clutch element 384 to its alternate position, the tongue 386 engages in a groove in the face of a gear 388 loosely mounted on the shaft 381. This gear is driven from the shaft 382 at the same speed as the gear 387 but in the opposite direction through the back gears 389, 390 and 391. When the clutch element 384 is moved into an intermediate position, the driving connections above described are broken and the rotation of the tape feed sprocket 56 is accordingly interrupted.

The shaft 382 is driven from the main cam shaft 47 through a gear train including a pair of uniformly accelerated gears comprising a driven member 392 fast on the shaft 382 and a driving member 393 fast on a shaft 394. The shaft 394 is rotated through a single revolution in each operating cycle of the main cam shaft through a driving connection including bevel gears 395 and 396, shaft 397, and bevel gears 398 and 399, the latter gear being keyed to the main cam shaft 47.

The driving member 393 in its preferred form comprises a generally elliptical gear segment 393' having one side cut away to form driving and locking surfaces 400 and 400'. The driven member 392 includes an elliptical gear segment 392' especially shaped to cooperate with the gear segment 393' of the driving member. One side of the member 392 is extended to form an enlarged gear tooth 401 having its side edges cut to provide oppositely facing pitch surfaces 401' for cooperating with the driving and locking surfaces 400 and 400' of the member 393.

Rigid with the driving member 393 are a pair of radially projecting arms of which one arm 402 is shown in Fig. 20. Each arm carries at its outer end a roller 403 adapted to coact with pitch surfaces on a locking and driving member 404 rigid with the driven member 392. These pitch surfaces are generated from the pitch surfaces of the tooth 401 to assist in imparting the uniformly accelerated and decelerated movement to the driven member.

The various elements of the drive mechanism including the members 392 and 393 are positioned on their respective shafts so that they occupy the position shown in Fig. 20 at the beginning and end of each operating cycle. This may be called the initial position of the mechanism. By reason of the shape of the tooth 401 and indentation 400, the driving member 393 rotates through a predetermined angle at the beginning of the cycle while the member 392 remains stationary. This provides a dwell for the performance of various functions of the machine such as the setting of the clutch mechanism to be described hereinafter.

Upon further rotation of the driving member 393, the driving surface 400 engages the pitch surface 401' of the tooth 401 and turns the driven member with uniform acceleration until the teeth of the gear segments 392' and 393' engage. During this part of the cycle the roller 403 engages the upper pitch surface of the arm 404 and locks the members together to prevent the driven member 392 from running ahead of the driving member 393.

The drive is now effected through the teeth of the gear segments, the driven member uniformly accelerating until the first half of its revolution is completed and then uniformly decelerating. As the last tooth of the segment 393' passes the last tooth of the segment 392', the drive is taken over by the arm 402 and roller 403 acting on the lower pitch surface of the arm 404. This pitch surface is formed to continue the uniform deceleration of the driven member until the latter is brought to a full stop at the end of a complete revolution. In the present instance, this revolution is completed shortly before the end of the cycle of the driving member so as to provide a dwell of sufficient length to restore various parts of the machine to normal position. Overrunning of the driven member is prevented during the latter position of its cycle by the locking action of the locking surface 400' in engagement with the rear pitch surface of the tooth 401.

It will be apparent from the foregoing that, by reason of the shape of the members 392 and 393, the shaft 382 is uniformly accelerated in the first half of its revolution and uniformly decelerated in the second half of the revolution. As the feed of the control strip 34 is effected through the medium of this shaft, the feed movements of the strip are therefore executed with uniform acceleration regardless of the direction of the feed. The machine is thus enabled to operate at a high rate of speed without danger of tearing or otherwise damaging the control strip.

Power actuated means is provided for shifting the clutch element 384 into engagement with the gears 387 and 388 or into an intermediate position in which the tape feed is interrupted. This means as herein shown comprises a cam 405 (Fig. 20) on the main cam shaft 47 arranged to oscillate a pivoted cam follower 406 having an arm 407 connected by a link 408 with a crank arm 409 fast on a rock shaft 410. Fast on the rock shaft 410 is a depending crank arm 411 on which is pivoted a floating lever 412. One arm of the lever 412 has a lug and notch connection with a shifter bar 413 which is formed with a yoke 414 engaging in an annular groove 415 in the element 384. The other arm of the lever is pivoted to a latch bar 416 supported for endwise movement in the same plane as the key flags and extending parallel thereto.

When the latch bar is permitted to move toward the observer in Fig. 20, the floating lever rocks about its pivot in a counterclockwise direction upon oscillation of the shaft 410 and the clutch element remains in engagement with the gear 387, thus maintaining the normal driving connection for feeding the control tape forwardly. When the latch bar 416 is blocked, the floating lever is rocked in a clockwise direction to move the shifter bar 413 forwardly and shift the clutch element 384 into driving engagement with the gear 388. Under these conditions, the control tape feed is reversed. To shift the clutch element into intermediate position and interrupt the tape feed, the latch bar is permitted to move through approximately one half of its full stroke. In this case, the floating lever moves the shifter bar 413 sufficiently to disengage the clutch element from the gear 387 but not sufficiently to engage the gear 388. The tape feed is accordingly interrupted.

The means for controlling the clutch shifting mechanism in its preferred form comprises a group of control bars extending over the latch bar 416 and suitably notched for cooperation with the latter bar as shown in Fig. 20. These include a reverse bar 417, a forward feed bar 418, a tape reverse bar 419, and the auxiliary control bar 332. The control bars 417 and 418 are controlled respectively by flags 421 and 422 actuated by suitable forward and reverse feed keys 423 and 424 (Fig. 2) of the keyboard. The latch bar 416 is formed with notches corresponding to the various control bars, the notches for the bars 417 and 418 being of a width such that the latch bar is permitted to move through a half stroke when either of these control bars are in advanced position. Upon such movement of the latch bar, the shifter bar is likewise moved through a half stroke and the clutch member 384 is thereby shifted to its intermediate or neutral position to interrupt the driving connection for the shaft 381. Thus the tape feed is interrupted in the cycle initiated by the depression of either of the keys 423 or 424 during which the operated control bar shifts the anvil progression bar 361ª to determine the direction of progression of the printing mechanism.

Control bars 417 and 418 jointly control the operation of the reverse bar 419 which is operative when blocked to block the latch bar 416 and reverse the tape feed. This control is effected through the medium of a latch 425 having laterally extending arms 426 and 427 engaging respectively in notches in the control bars 417 and 418. The arrangement is such that the control bar 417 when allowed to advance shifts the latch 425 into the path of a shoulder 428 on the reverse bar 419. The latch is held in this position by an over-center device comprising a flat spring 429 coacting with an arm 430 rigid with the latch. Thus, the reverse bar is prevented from advancing in succeeding cycles of the machine although the control bar 417 is restored to normal in the usual manner after one operating cycle. The tape is therefore fed reversely until the forward feed key is operated.

Operation of the forward feed key permits the control bar 418 to advance and withdraw the latch 425 by engaging the arm 427. The latch is held in withdrawn position by the over-center device and the tape is therefore fed forwardly in each succeeding cycle since the reverse bar 419 is unblocked and can accordingly advance in each cycle and unblock the latch bar 416.

During the tabulating cycle, it is desirable to interrupt the tape feed during the second and third revolutions of the main shaft as hereinbefore explained. The tabulating numeral release bar 322 which is operated in this particular portion of the tabulating cycle is therefore notched in such manner that when operated, it permits the auxiliary control bar 332 to advance. The bar 332, like control bars 417 and 418, is arranged to partially block the latch bar 416, that is, it permits movement of the latch bar through a half stroke so that the clutch is disengaged and the tape feed interrupted under these conditions.

*Brief résumé of operation*

In the operation of the machine for composing tabular matter, the control unit of the tabulating mechanism is first set in accordance with the tabular form to be composed. Assume by way of illustration that it is desired to produce a tabular composition with lines of sixty ems' length having 120 printing or digit positions. In this particular composition there are six tabular columns and it may be assumed that the initial digit position or left-hand digit of the respective tabular columns are located respectively at the digit positions 10, 15, 30, 50, 93 and 105.

Initially the tabulating mechanism is conditioned for the operation of setting up the above tabular form by the manual withdrawal of the detent 205 of the column slide 201 and movement of the slide to the extreme left (see Figs. 9 to 16). In this operation, the cam 215 (Fig. 14) blanks any pushed pins in the pin chain 210 that were used in the previous tabulating setup.

The slide is now operated into a set position determined by the number of columns in the assumed form. Thus the slide is moved to the right (Fig. 9) and its detent 205 entered in the hole provided in the frame when the slide is alined with the figure six on the scale 206. In this movement of the slide, six of the pin bars 141 corresponding to the six columns of the tabular composition are shifted by their springs 154 into position for engagement by the pins 212 of the pin chain 210.

In the next operation the pins 142 of the six active pin bars are set in combinations representative of the first digit positions in the various tabular columns. In this operation, the operator first depresses the pin pusher lever 161 which operates the blanker 197 (Figs. 10, 12 and 14), thereby blanking the previous setting of the pins in the first pin bar at the left end of the pin bar car. On the upstroke of the lever 161, the pin bar car 150 is advanced one step, thereby bringing the first pin bar corresponding to the first tabular column into alinement with the pin pushers 148 (Fig. 12). The car is held in this position by the locking pawl 168. With the car in this position, all of the flags of the keyboard are now locked by the locking bar 333 which is advanced to locking position by engagement of the pin bar car with the lever 334 (Fig. 15).

The operator now withdraws the detent 179 (Figs. 1 and 3) of the setting plate 149 and moves this plate to the left until the detent is in line with the notch No. 10 in the frame. This marks the initial digit position of the first tabular column and alines the tenth row of holes in the slide with the pin pushers 148. When the hand lever 161 is now depressed, the pin pushers 148 are advanced and those encountering holes in the setting plate operate to push the pins 142 alined with such holes. In this way, the pins of the first pin bar are set in a permutational combination representing the initial digit position of the first tabular column.

The above operation is repeated for the next four pin bars, the setting plate being adjusted manually to positions 15, 30, 50 and 93, so that each of the bars is set in a combination corresponding to the tabular column which it represents. Since these columns appear in the first half of a line of maximum length, the eighth pin pusher 148 is latched in inoperative position by the latch 196.

The sixth column falls in the second half of the line. Accordingly, the eighth pin pusher is unlatched and the setting slide moved to position 195. This position corresponds to position 9 and the setting of the pin bar is therefore the same as that for position 9 except that the eighth pin of the bar is pushed.

The pin bars corresponding to the various tabular columns having been set in various combinations representative of the first digit position in each column, they are next shifted into their active positions relative to the code bars 87 controlling the combination bars 83 and 84 (Figs. 1 and 7) which govern the setting of the master tapes 81 and 82 in the selection of signals representing the digit positions in the various tabular columns at which printing is to occur. The pin bars are shifted into their active positions successively by the operation of the pin chain 210. In this operation one of the pins 212 of the chain is set and the chain moved manually to shift the first pin bar. Thereafter the remaining bars are shifted automatically as the chain is advanced in the operation of the tabulating cam shaft 33. Initially the operator releases the pin bar car by depressing the hand lever 170 (Fig. 15) and the car is returned to normal rest position by its spring 160. The operator then depresses the lever 216 (Fig. 14) to set the first pin 212 of the pin chain. The pin thus set is the one in the link located one step to the left of the first pin bar (Fig. 12); hence the operator must turn the hand wheel 240 (Fig. 19) to advance the set pin one step and thereby shift the first pin bar into active position. The tabulating mechanism is now conditioned for automatically selecting the columns in response to the operation of the tabulating keys.

Assuming that the first character to be printed is to appear in the third digit position of the first tabular column, the operator will depress the third tabulating key, namely, key 37. Depression of this key rocks the shaft 272 (Fig. 17) and advances the tabulating signal flag 77. The latter, through the segment 300 and bail 287, withdraws the latch 290 (Figs. 1 and 19) of the release bar 293 and at the same time positions the push rod 312 in the path of the lug 313 on the release bar. The release bar in advancing withdraws the detents 297 and 306 of the main cam shaft clutch 48 and the tabulating cam shaft clutch 49 respectively, thereby initiating an operating cycle.

As the main cam shaft 47 is rotated through its first cycle, release bar 293 is withdrawn to release the control bars 75, 78 to the control of the various flags. In this instance, certain of the control bars are blocked by the tabulating signal flag 77 to set the bars in a combination corresponding to the tabulating signal.

During the first cycle of the main cam shaft, the punch feeler bars 74 are advanced by the action of the cam 66 to feel the setting of control bars 75 and to operate the punches 51 to perforate the control tape with a signal combination corresponding to the setting of the bars. This is the tabulating signal which conditions the typographic machine for carrying out the tabulating operation. In this cycle of the main shaft, the tabulating cam shaft operates through the first quarter of its cycle, and in so doing, cam 255 operates to withdraw the bail 254 (Fig. 16) to permit the pin bar code bars 87 to advance. Also, the locking bar 338 is advanced by cam 129 (Fig. 7) to locking position, thereby locking the flag of the tabulating key 37 in advanced position. The code bars 87 not blocked by the set pins of the first pin bar advance through a full stroke and select one each of the combination bars 83 and 84 which are then permitted to advance into the path of the master tapes 81 and 82 (Figs. 1 and 7) upon withdrawal of the bail 85.

The master tapes 81 and 82 begin their advancing movement at this time under the control of the cam 97 (Fig. 7) acting through the master tape arm 91. Near the end of the first cycle, the tabulating release bar 322 (Fig. 18) is advanced by the cam 316 to move the latches 290 and 291 out of the path of the release bar bell crank 292. The main cam shaft therefore does not stop at its rest position upon completion of the first cycle but continues through a second and third cycle in which the tabulating cam shaft is rotated through the second and third quarters of its operating cycle.

In the second cycle of the main cam shaft, the control bars 75 are blocked by the tabulating release flag 322 so that none of the punches 51 are operated. The auxiliary bar 332 is also blocked by the tabulating release bar and causes the latch bar 416 to advance through half a stroke and disengage the clutch 385 of the tape feed mechanism. The tape feed is accordingly interrupted during this cycle as well as during the succeeding cycle of the main shaft. The master tapes 81 and 82 advance with uniform acceleration during the second cycle of the main shaft until they are stopped by advanced code bars 83 and 84 respectively. At this point, the master tape latch bolts 101 and 102 are entered in the notches of the master tapes and the combination bars 83 and 84, which control the initial positioning of the master tapes, are returned to normal position by the bail 85.

During the third cycle of the main cam shaft, the digit positioner slide 104 is permitted to advance two steps since the positioner slide bar 116 is formed with a double width notch cooperating with the flag 265 of the operated tabulating key 37. The master tapes are thus set to select a signal combination representing the third digit position of the first tabulator column. In this particular instance, the signal represents the twelfth printing position of the line since the initial digit position of the column, as set up on the control unit, is the printing position 10.

Upon completion of the setting of the master tapes 81 and 82, the floating levers 132 are operated to advance the master tape feelers 131 into engagement with the master tapes. The latch bars 79 are therefore set in a combination corresponding to the signal combinations selected by the master tapes. Near the end of the third cycle of the main cam shaft, the tabulating release bar 322 is withdrawn and the tabulating numeral release bar 324 is advanced to hold the latches 290 and 291 in withdrawn position.

In the fourth operating cycle of the main cam shaft, the tabulating numeral release bar 324 which is in advanced position blocks all of the control bars except the auxiliary control bar 332 which cooperates with the feeler bar. The tape 34 is therefore advanced one step near the end of the cycle. Before the tape is advanced, however, the punches 51 are operated under control of the latch bars 79 to perforate the selected tabulating numeral signal on the control tape. In this way the character of the operation performed under control of the main cam shaft in one of the plurality of cycles is governed by the tabulating mechanism operating under control of the tabulating cam shaft. The latch bars 79 also operate the code bars to select the anvil code bar of the twelfth anvil and condition this anvil for printing in the next operating cycle of the machine. The master tapes 81 and 82 are now returned to normal position and the machine is then ready to perforate ordinary character signals in the control tape and to print characters corresponding to such signals on the proof sheet in the proper position.

After the characters are printed in the first column, the selection of the tabulating signals for the second and subsequent columns is effected in the manner above described by the depression of one of the tabulating keys. After the signal for the last column is selected and recorded on the control tape, the machine is conditioned for composition of the next line by blanking the previously set pin 212 of the pin bar chain and automatically setting of the pin next engageable with the first pin bar 141. The operator may thus prepare the tabular composition with a minimum of effort and is only required to select one of the five keys provided for the different digit columns.

It will be apparent from the foregoing that the invention provides a tabulating mechanism of novel and advantageous construction which greatly facilitates the composition of tabular matter. The mechanism may be readily set to conform to any desired tabular form. When thus set, the work of the operator is reduced to a mere actuation of a tabulating key, the mechanism operating automatically to select and record on the control tape the proper permutational signal combinations required to control a typographic machine in producing tabular matter in accordance with the desired form.

The invention also provides novel means for controlling both printing and perforating mechanisms in the composition of tabular matter. With this arrangement, the machine is enabled to produce a proof sheet corresponding in form to the final copy thereby greatly facilitating the work of the operator in setting up the composition.

The invention also provides novel tape feeding mechanism particularly adapted for high speed operation and operative to feed the tape either forwardly or backwardly. It also embodies means of a novel character for interrupting the tape feed during certain operating cycles of the machine to avoid the appearance of blank spaces on the tape which cause loss of time through idle cycling of the typographic machine.

I claim as my invention:

1. In a tabulating mechanism for use in control form composing machines, in combination, a series of elements adapted to be set in different permutational combinations, tabulating apparatus operable to set said elements in a combination effective to designate a predetermined position in a line of composition, and means controlled by said elements for recording a signal on the control form corresponding to the setting of said elements.

2. The combination in a machine for preparing control forms for typographic machines, of a tabulating mechanism comprising a series of elements adapted to be set selectively in different combinations each representative of a different character position in a line of composed matter, means for selectively setting said elements in any one of said combinations, and means controlled by the elements for recording a distinctive signal on the control form indicative of the line position represented by each setting of the elements.

3. The combination in a machine for preparing control forms for typographic machines, of a tabulating mechanism comprising a series of elements adapted to be set selectively in different permutational combinations each representative of a different character position in a line of composed matter, means for selectively setting said elements to designate successive columnar positions in the line of composed matter, and means controlled by the elements for recording signals in the control form to designate the respective columnar positions.

4. In a machine for preparing control forms for typographic machines, in combination, a recording mechanism for recording signals on a control form, a manually operable keyboard for controlling said recording mechanism to record selected signals on the control form, and a tabulating mechanism also operable to control said recording mechanism to record selected signals on the control form, said tabulating mechanism acting to select signal combinations representative of predetermined character positions in a line of composition.

5. In a machine for preparing control forms for typographic machines, in combination, a recording mechanism for recording signals on a control form, a manually operable keyboard for controlling said recording mechanism to record selected signals on the control form, a tabulating mechanism comprising a control unit adapted to be set in accordance with any predetermined tabular pattern, a selecting mechanism operable under control of said unit to select signal combinations in accordance with the setting of the unit, and means operable by said selecting mechanism to control said signal recording mechanism to record the selected signals on the control form.

6. The combination in a machine for preparing control forms for typographic machines, of a tabulating mechanism including a control unit adapted to be set to designate the locations of a plurality of columns in a line of tabular composition, signal selecting mechanism operable under control of said unit to select signals individual to said locations, and recording mechanism operable under control of said selecting mechanism to record the selected signals on the control form.

7. In a machine for preparing control forms for typographic machines, in combination, a recording mechanism for recording signals on the control form, means for selectively operating said mechanism to record signals representing characters to be printed in tabular columns, means for operating said recording mechanism to record signals representing the positions in a line at which the tabular columns are to be located, said means comprising a device having a control member for each tabular column operative to control the recording mechanism, and means for operating said members successively.

8. In a machine for preparing control forms for typographic machines, in combination, a recording mechanism for recording signals on the control form, means for selectively operating said mechanism to record signals representing characters to be printed in tabular columns, means for operating said recording mechanism to record signals representing the positions in a line at which the tabular columns are to be located, said means comprising a control member for each tabular column, shiftable elements carried by each member adapted to be set in different permutational combinations each representing a predetermined position in the line, and means for operating said members successively to place said recording mechanism under control of the set elements of the respective members.

9. In a machine for preparing control forms for typographic machines, in combination, a series of recording elements adapted to be operated in predetermined combinations to record signals on the control form, and means for selectively controlling said elements to record signals designating any one of a plurality of tabular positions in a line, said means comprising a series of codal elements, means for setting said elements in different combinations each representing a particular position in the line, and a manually operable key for initiating the operation of said setting means.

10. In a machine for preparing control forms for typographic machines, in combination, a series of recording elements adapted to be operated in predetermined combinations to record signals on the control form, and means for selectively controlling said elements to record signals designating any one of a plurality of tabular positions in a line, said means comprising a series of codal elements, a plurality of control members including one for each column, means normally effective to hold said members in an inactive position, means for moving said members into active position successively to set said elements in the combinations representing successive tabular columns, and a manually operable key for initiating the operation of said last means.

11. The combination in a composing machine, of a perforating mechanism for recording signal combinations representing characters on a control tape for use in controlling typographic machines, a proof sheet printer operative to print characters corresponding to the signals recorded on the tape, and tabulating mechanism for controlling said perforating mechanism and said printing mechanism, said perforator being operative under control of said tabulating mechanism to record signals for causing the typographic machine to produce a composition arranged in a predetermined tabular pattern while said printing mechanism prints the proof sheet in said predetermined tabular pattern.

12. The combination in a composing machine, of a perforating mechanism for recording signal combinations representing characters on a control tape for use in controlling typographic machines, a proof sheet printer operative to print characters corresponding to the signals recorded on the tape, and tabulating mechanism for controlling said perforating mechanism and said printing mechanism, said tabulating mechanism being operative to cause said perforating mechanism to record signals designating predetermined positions in a line in which characters are to be printed in the composition prepared by the typographic machine and for conditioning said printing mechanism to print in corresponding line positions on the proof sheet.

13. In a machine for preparing control forms for typographic machines, in combination, a series of elements adapted to be set in different permutational combinations each designating a predetermined position in a line of composition, a recording mechanism operable under control of said elements for recording on the control form a signal corresponding to the setting of said elements, a proof printer, and means controlled by said elements for conditioning said printer to print at the position in the line designated by the signal recorded on the control form.

14. In a machine for preparing control tapes for typographic machines, in combination, a punch mechanism for perforating control signals on the tape, a printing mechanism for printing a proof sheet, a spacing mechanism for determining the position on said sheet at which printing is to be effected, a series of control elements operative to control said punch mechanism and said printing mechanism simultaneously, and a second series of control elements operative to control said punch mechanism and said spacing mechanism simultaneously.

15. In a machine for preparing control forms for typographic machines, in combination, a recording mechanism for recording signals on the control form, a printing mechanism having a plurality of convertible type positioned for printing on a proof sheet and on the control form, means for converting all of said type simultaneously to form a character corresponding to a signal recorded on the control tape, and means operative to effect a printing operation on the proof sheet and the control form simultaneously.

16. In a machine for preparing control forms for typographic machines, in combination, a signal recording mechanism, a printing mechanism, means for selectively operating said mechanisms to record signals on the control form and to print corresponding characters on a proof sheet respectively, and means for operating said recording mechanism to record signals on the control form designating predetermined positions in the line at which printing is to be effected and for simultaneously operating said printing mechanism to condition the mechanism for printing in said predetermined positions on the proof sheet.

17. In a signal selecting mechanism, in combination, a pair of elongated plates supported in side-by-side relation for independent endwise movement, signal indicia on each plate, said indicia being in the form of groups of holes arranged in permutational combinations, means for shifting said plates to aline any selected group of holes in one plate with any selected group of holes in the other plate, and means for reading the alined groups of holes as a single signal combination.

18. In a signal selecting mechanism, in combination, a pair of elongated plates supported in side-by-side relation for independent endwise movement, signal indicia on each plate, said indicia being in the form of groups of holes arranged in permutational combinations, a series of feelers supported for movement toward and from said plates, means for shifting said plates to aline a selected group of holes in each plate with said feelers, and means for moving said feelers toward the plates to read the alined groups of holes as a single signal combination.

19. The combination with a signal recording mechanism, of a signal selecting mechanism comprising a pair of elongated plates supported in side-by-side relation for independent endwise movement, signal indicia on each plate, said indicia being in the form of groups of holes arranged in permutational combinations, a signal reading mechanism, means for shifting said plates to aline a selected group of holes in each plate with said signal reading mechanism, means for operating the mechanism to read the aligned groups of holes as a single signal combination, and means controlled by the signal selecting mechanism for operating the recording mechanism to record said signal combination.

20. The combination with a signal recording mechanism, of a signal selecting mechanism comprising a pair of elongated plates supported in side-by-side relation for independent endwise movement, signal indicia on each plate, said indicia being in the form of groups of holes arranged in permutational combinations, a series of feelers supported for movement toward and from said plates, means for shifting said plates to aline a selected group of holes in each plate with said feelers, means for moving said feelers toward the plates to read the alined groups of holes as a single signal combination, and means operated by said feelers for controlling the operation of the signal recording mechanism.

21. In a machine for preparing control tapes, in combination, a perforating mechanism including a series of punches adapted to perforate the tape, signal selecting mechanism comprising a pair of elongated plates supported in side-by-side relation for independent endwise movement, signal indicia on each plate, said indicia being in the form of groups of holes arranged in permutational combinations, a signal reading mechanism, means for shifting said plates to aline a selected group of holes in each plate with said signal reading mechanism, means for operating the mechanism to read the alined groups of holes as a single signal combination, and means actuated by the signal reading mechanism for controlling the operation of said punches whereby to perforate the control tape with a series of holes corresponding to said signal combination.

22. A signal selecting mechanism comprising, in combination, a pair of flat plates each having a series of groups of holes arranged in permutational combinations, selectively operable means for shifting at least one of the plates relative to the other plate to aline any group of holes in said one plate with any group in the other plate, and means for reading the alined group of holes as a single signal combination.

23. In a permutational signal selecting mechanism, in combination, a pair of relatively movable members each having a series of groups of elements arranged in permutational combinations, a signal reading mechanism, selectively operable means for shifting said members to position a selected group of elements of each member in operative relation to said mechanism, and means in said mechanism for reading the selected groups of elements as a single signal combination.

24. A mechanism for selecting multiple unit permutational code signal combinations comprising, in combination, two relatively movable members each having a series of elements arranged in permutational combinations, said combinations having one half the number of units of said code signals, means for moving one of said members relative to the other to aline any combination of elements of one member with any combination of elements of the other member, and means for reading the alined elements of both members as a single permutational code signal combination.

25. In a selector mechanism, in combination, a pair of members adapted to be moved varying distances to effect selecting operations, a group of combination bars for each member, said bars being arranged in side-by-side relation for movement into the path of the associated members to block the same and thereby determine the extent of movement of the members, a series of code bars associated with said combination bars adapted to be set in different combinations and effective in each setting to release a selected combination bar in each group, and means for moving the selected combination bars into controlling relation to said members.

26. In a selecting mechanism, in combination, a pair of relatively movable members each having a series of groups of elements arranged in different permutational signal combinations, a series of combination bars for setting said members, means for operating said bars selectively to position said members with a selected group of elements of one member alined with a selected group of elements of the other member, means for restoring said combination bars to normal position, and means for retaining said members in set position after the combination bars are restored.

27. In a signal selecting mechanism, in combination, signal reading mechanism, a pair of members each having a series of groups of elements arranged in different permutational combinations, means for shifting said members to position a selected group of elements of each member in operative relation to said reading mechanism, a series of combination bars operable selectively to determine the positions of said members, and means for latching said members in shifted position independently of said combination bars.

28. In a tabulating mechanism for use in control form composing machines, in combination, a control unit including a record medium, manually operable means for recording data on said medium representing a predetermined tabular pattern, a signal selecting medium operable under control of said unit to select signal combinations distinctive to said predetermined tabular pattern, and means controlled by the selecting mechanism for recording the selected signals on the control form.

29. In a tabulating mechanism for use in control form composing machines, in combination, a control unit including a record medium, manually operable means for recording data on said medium, said data identifying the position in the line of each column of a tabular composition, signal selecting mechanism operable under control of said unit for selecting signal combinations distinctive to said positions, and means controlled by said signal selecting mechanism for recording the selected signals on the control form.

30. In a tabulating mechanism for use in control form composing machines, in combination, a control unit including a record medium having a series of groups of settable elements, manually operable means for setting the elements of each group in a permutational combination designating the position in a line of one of the columns of a tabular form, a signal selecting mechanism, means for operating said selecting mechanism under control of said groups of elements to select signal combinations distinctive to the positions designated by the elements, and means for recording the selected signal combinations on the control form.

31. In a tabulating mechanism for use in control form composing machines, in combination, a control unit including a record medium having a series of groups of settable elements, manually operable means for setting the elements of each group in a permutational combination designating the position in a line of one of the columns of a tabular form, a signal selecting mechanism, means for placing said selecting mechanism under control of said groups of elements successively to select a signal combination distinctive to each column position, and signal recording mechanism operative under control of said selecting mechanism to record the selected signal combinations on the control form.

32. In a selector mechanism, in combination, a series of combination bars, a group of code bars adapted to be operated in different permutational combinations to control said combination bars selectively, a control member having codal elements adapted to coact with said code bars to control the setting thereof, and means for varying the arrangement of said elements.

33. In a selector mechanism, in combination, a series of combination bars, a group of code bars adapted to be operated in different permutational combinations to control said combination bars selectively, a control member having codal elements for controlling the setting of said code bars, means normally operative to hold said member in an inactive position, means for moving the member into an active position to place said elements in controlling relation to said code bars, and means for varying the arrangement of said elements.

34. In a selector mechanism, in combination, a series of combination bars, a group of code bars adapted to be operated in different permutational combinations to control said combination bars selectively, a control member comprising a bar extending across the group of code bars, codal elements carried by said member for controlling the setting of the code bars, means normally operative to hold the member in an inactive position, means for shifting said member longitudinally to place said elements in controlling relation to said code bars, and manually operable means for varying the arrangement of said elements.

35. In a selector mechanism, in combination, a series of combination bars, a group of code bars adapted to be operated in different permutational combinations to control said combination bars selectively, a control member comprising a bar extending across the group of code bars, a series of settable pins carried on said member, there being one pin for each code bar, means for setting said pins selectively to project the same into notches formed in the associated code bars, and means for shifting said member longitudinally to move the set pins into or out of the notches of the associated code bars.

36. In a selector mechanism, in combination, a series of combination bars, a group of code bars adapted to be operated in different permutational combinations to control said combination bars selectively, a control member comprising a bar extending across the group of code bars, a series of settable pins carried on said member, there being one pin for each code bar, manually operable means for setting said pins in different permutational combinations, said pins when set projecting into notches formed in the associated code bars, and means for shifting said member to move the pins transversely of the code bars and into or out of the notches of the code bars to control the setting of the bars.

37. In a selector mechanism, in combination, a series of combination bars, a group of code bars adapted to be operated in different permutational combinations to control said combination bars selectively, means for holding said code bars in a retracted position, a control member comprising a bar extending across the group of code bars, a series of settable pins carried on said member, there being one pin for each code bar, means for setting said pins in different permutational combinations, said pins when set projecting into notches formed in the associated code bars, means for shifting said member longitudinally to move the set pins into or out of the notches of the associated code bars, and means for operating said holding means to release the code bars to the control of the set pins when the pins are entered in the notches.

38. In a selector mechanism, in combination, a series of combination bars, a group of code bars adapted to be operated in different permutational combinations to control said combination bars selectively, a series of control members each having codal elements adapted to coact with the code bars to control the setting thereof, means for varying the arrangement of the elements of each of said members, and means for rendering the members effective individually to control the setting of the code bars through the medium of their respective codal elements.

39. In a selector mechanism, in combination, a series of combination bars, a group of code bars adapted to be operated in different permutational combinations to control said combination bars selectively, a series of control members, each comprising a bar extending across the group of code bars, a series of settable pins on each member, there being one pin for each code bar, means for setting the pins in different permutational combinations, said pins when set projecting into notches formed in the associated code bar, means normally operative to hold said members in an inactive position with the set pins withdrawn laterally from the notches of the code bars, and means for shifting the members into active position individually whereby to move the pins thereof into controlling relation to the code bars.

40. In a machine for preparing control forms for typographic machines, in combination, a series of character keys, a tabulating key, a recording mechanism operative in response to the actuation of any one of said character keys for recording on the control form a signal combination designating the character represented by the actuated key, and tabulating mechanism operative in response to the actuation of said tabulating key for operating said recording mechanism to record two signals on the control form, one of said signals serving to condition the typographic machine for a tabulating operation and the other signal designating a predetermined position in a line in which a character is to be printed.

41. The combination in a machine for preparing control forms for typographic machines, of a signal recording mechanism, a tabulating mechanism adapted to be set in accordance with any predetermined tabular pattern, a selecting mechanism operable under control of said unit to select signal combinations representing the location of the tabular columns in the finished copy, a manually operable key, means actuated by said key for operating the recording mechanism to record a distinctive signal on the control form and for initiating the operation of the selecting mechanism, and means actuated by the selecting mechanism for operating the signal recording mechanism to record a second signal on the control form, said second signal being the signal selected by said mechanism.

42. In a machine for preparing control forms for typographic machines, in combination, a series of control elements, a manually operable key, means operative upon the actuation of said key for setting said elements in a predetermined combination, a second series of elements, means for setting the elements of said second series in different permutational combinations each designating a predetermined position in a line, and a recording mechanism operative in response to the operation of said key to record signals on the control form corresponding to the setting of each series of elements.

43. In a machine for preparing control forms for typographic machines, in combination, a series of control elements, a manually operable key, means operative upon the actuation of said key for setting said elements in a predetermined combination, a second series of elements, means for setting the elements of said second series in different permutational combinations each designating a predetermined position in a line, a recording mechanism adapted to be controlled by both series of elements, and means actuated upon the operation of said key for initiating the operation of said mechanism to record on the control form a first signal corresponding to the setting of the first series of elements and a second signal corresponding to the setting of the second series of elements.

44. In a machine for preparing control forms for typographic machines, in combination, a signal recording mechanism, a tabulating mechanism including a record medium adapted to be set in accordance with a predetermined tabular pattern, a selector mechanism operable under control of said medium to select signal combinations in accordance with said pattern and to operate said recording mechanism to record the selected signals on the control form, a series of keys, means operative in response to the actuation of any one of said keys for initiating the operation of said tabulating mechanism, and means operated by certain of said keys for modifying the selecting operation of said selector mechanism.

45. In a machine for preparing control forms for typographic machines, in combination, a series of tabulating keys, a tabulating mechanism comprising a control unit adapted to be set in accordance with a predetermined tabular pattern, a selecting mechanism operable under joint control of said unit and said keys for selecting signal combinations designating the line positions of the different columns of said pattern, and signal recording mechanism operative to record the selected signals on the control form.

46. In a machine for preparing control forms for typographic machines, in combination, a series of keys each representing a different digit position of a tabular column, a control unit including means adapted to be set to designate the location in the line of the initial digit position of each tabular column, a selecting mechanism operable under control of said unit to select signal combinations designating the initial digit position of the tabular column, and means controlled by said keys for modifying the action of said selecting mechanism to select signal combinations designating digit positions other than the initial digit column of the tabular column, and signal recording mechanism operative to record the selected signal combinations on the control form.

47. The combination in a selector mechanism including a set of code bars, of a member movable into a predetermined position to effect a selecting operation in accordance with the setting of said bars, and means for imparting additional movement to said member to modify the selecting operation.

48. The combination in a selector mechanism including a set of code bars, of a pair of members movable independently into predetermined positions to effect a selecting operation in accordance with the setting of said bars, and means for imparting additional movement to one of said members to modify the selecting operation.

49. A perforating mechanism, comprising, in combination, a series of punches, an actuating slide for each punch, said slides being arranged in parallel side-by-side relation, a punch operating bar for each slide extending transversely of said slide, a lug on said bar engaging in a notch in the associated bar, said lug and notch being disposed at an angle to the longitudinal axes of the bar and slide, and power driven means for imparting endwise movement to the bars, said bars acting through the lug and notch connections to advance the associated slides and their punches into operated position.

50. A perforating mechanism comprising, in combination, a series of punches, an actuating slide for each punch, said slides being arranged in parallel side-by-side relation, a punch operating bar for each slide extending transversely of said slide, a lug on said bar engaging in a notch in the associated bar, said lug and notch being disposed at an angle to the longitudinal axes of the bar and slide, an oscillating member, a lever pivoted intermediate its ends on said member for oscillation therewith, means operatively connecting one end of the lever with said bar, a feeler pivoted to the other end of the lever, and means operative to block said feeler against movement whereby said lever is forced to rock about its pivot incident to the oscillation of said member and thereby impart endwise movement to said bar, said bar being effective in such movement to advance the associated slide and its punch through the medium of the lug and notch connection.

51. In a signal recording mechanism, in combination, a series of recording elements, a first group of controlling elements adapted to be set selectively, a second group of controlling elements adapted to be set selectively, and means for rendering either group of controlling elements effective to control said recording elements.

52. In a signal recording mechanism, in combination, a series of recording elements, two groups of controlling elements each adapted to be set in different permutational combinations representing code signals, and means for rendering either of said groups effective to control said recording elements.

53. In a perforating mechanism, in combination, a series of punches, punch operating elements, two groups of controlling elements for said punches, means for setting the elements of said groups in different permutational combinations, and means for operatively associating either group of elements with said punch operating elements to control the operation of said punches.

54. In a perforating mechanism, in combination, a series of punches, punch operating elements, a group of control bars adapted to be set in different permutational combinations, a group of latch bars also adapted to be set in different permutational combinations, and means for operatively associating either group of bars with said punch operating elements to control the operation of said punches.

55. In a perforating mechanism, in combination, a series of punches, a punch operating member for each punch, a reciprocable support, a series of levers pivotally mounted intermediate their ends on said support, each lever being operatively connected at one end to one of said punch operating members, a feeler carried on the other end of each lever, a series of control members adapted to coact with said feelers, means for setting said control members in permutational combinations to thereby position certain of the members in blocking relation to the associated feelers, and means for reciprocating said support to move the feelers toward and from said control members, the levers whose feelers are blocked being operative in such movement to actuate their associated punch operating members and thereby operate the corresponding punches.

56. In a keyboard operated control strip composing machine, in combination, a driving shaft, a main cam shaft, signal recording mechanism actuated by said main cam shaft, an auxiliary cam shaft, signal selecting mechanism controlled by said auxiliary cam shaft, a clutch for connecting said driving shaft and the main cam shaft, a second clutch for connecting said main cam shaft and said auxiliary cam shaft, key actuated means for tripping said clutches simultaneously to initiate an operating cycle of the machine, means normally effective to disengage said first clutch upon completion of a single revolution of the main cam shaft, and means actuated by said auxiliary cam shaft for temporarily disabling said clutch disengaging means, said main cam shaft continuing in operation to record the signal selected by the selecting mechanism.

57. In a control strip composing machine, in combination, a driving shaft, a cyclically operable main cam shaft, signal recording mechanism controlled by said main cam shaft, an auxiliary cam shaft operating on a cycle different from that of the main cam shaft, signal selecting mechanism controlled by said auxiliary cam shaft, a clutch for connecting said driving shaft and the main cam shaft, a second clutch for connecting said main cam shaft and said auxiliary cam shaft, manually operable means for tripping said first clutch including means for disengaging the clutch upon completion of a single operating cycle of the main cam shaft, means for tripping said second clutch simultaneously with the tripping of the first clutch, and means actuated by said auxiliary cam shaft for temporarily disabling said clutch disengaging means until said auxiliary cam shaft has completed a full cycle, said main shaft continuing in operation to condition the recording mechanism for recording the signal selected by the selecting mechanism.

58. In a control strip composing machine, in combination, a first cam shaft adapted to be operated in cycles, signal recording mechanism controlled by said cam shaft in each operating cycle, a second cam shaft operable in cycles each of which includes a plurality of cycles of said first shaft, signal selecting mechanism controlled by said second cam shaft, manually operable means for initiating the first operating cycle of said first cam shaft, and means controlled by said second cam shaft for initiating subsequent operating cycles of said first cam shaft to record a signal selected by the signal selecting mechanism.

59. In a control strip composing machine, in combination, a first cam shaft adapted to be operated in cycles to control predetermined functions of the machine, a second cam shaft operable in cycles each of which includes a plurality of cycles of said first shaft, said second cam shaft operating to control other functions of the machine, manually operable means for initiating the first operating cycle of said first cam shaft, and means actuated by said second cam shaft for initiating a predetermined number of additional operating cycles of said first shaft to coordinate the different machine functions controlled by the respective shafts.

60. In a control strip composing machine, in combination, a driving shaft, a main cam shaft adapted to be operated in cycles to control predetermined functions of the machine, a clutch for drivingly connecting said shafts, an auxiliary cam shaft adapted to be driven by said main shaft in cycles each of which includes a predetermined number of cycles of said main shaft, said auxiliary cam shaft operating to control other functions of the machine, manually operable means for tripping said clutch to initiate an operating cycle of said main shaft, and means actuated by said auxiliary cam shaft for tripping said clutch to operate the main shaft through said predetermined number of cycles to provide time for the performance of the functions controlled by the auxiliary cam shaft.

61. In a selectively operable machine, in combination, a driving shaft, a main cam shaft adapted to be operated in cycles to control predetermined functions of the machine, a clutch for drivingly connecting said shafts, an auxiliary cam shaft adapted to be driven by said main shaft in cycles each of which includes a predetermined number of cycles of said main shaft, said auxiliary cam shaft operating to control other functions of the machine, a clutch interposed between the main cam shaft and said auxiliary cam shaft, manually operable means for tripping both of said clutches simultaneously to initiate operation of said shafts through their cycles, means actuated by said auxiliary cam shaft for tripping said first clutch to operate the main shaft through said predetermined number of cycles to continue operation of the machine for an interval sufficient for the performance of the functions controlled by the auxiliary cam shaft, and means for disengaging both clutches upon completion of the operating cycle of said auxiliary shaft.

62. In a machine of the class described, in combination, a keyboard comprising a plurality of manually operable keys, a flag for each key adapted to be shifted from a normal position upon the actuation of the associated key, a control bar extending across said flags, means for imparting endwise movement to said bar, and cooperating lugs and notches formed in said flags and said bar whereby the extent of movement of the bar is determined by the particular key actuated.

63. In a machine of the class described, in combination, a keyboard comprising a plurality of manually operable keys, a flag for each key adapted to be shifted from a normal position upon the actuation of the associated key, a control bar extending across said flags, means for imparting endwise movement to said bar, and cooperating lugs and notches in said flags and said bar, the notches in said bar being formed so that each flag when operated is effective to block the bar after a different degree of movement.

64. In a machine of the class described, in combination, a keyboard comprising a plurality of manually operable keys, a codal element common to said keys and adapted to be shifted from a normal position upon the actuation of any one of the keys, and a group of control bars adapted to be operated in a predetermined combination under control of said element.

65. In a tape perforator, in combination, a punch mechanism, a series of control bars for controlling said mechanism, a codal element for controlling the operation of said bars, and a plurality of keys each operable to shift said element into controlling relation to said bars.

66. A selectively operable mechanism having, in combination, a main cam shaft operable cyclically to control predetermined functions of the mechanism, an auxiliary cam shaft operable in cycles different from the cycles of said main shaft to control other functions of the mechanism, means operable selectively to simultaneously initiate an operating cycle of each shaft, and means controlled by said auxiliary shaft in operating through its cycle to initiate an additional operating cycle of the main shaft.

67. A selectively operable mechanism having, in combination, a cyclically operable main control shaft operative in each cycle to control predetermined functions of the mechanism, a cyclically operable auxiliary control shaft operative in each cycle to control other functions of the mechanism, each cycle of said auxiliary shaft corresponding in length to a plurality of cycles of the main shaft, power actuated means for driving said shafts, control means operable selectively to condition said driving means to drive each of said shafts through a single operating cycle, and means controlled by said auxiliary shaft in operating through its cycle for conditioning the driving means to drive said main shaft through additional operating cycles.

68. A selectively operable mechanism having, in combination, a cyclically operable main control device rotatable through a predetermined angle at a definite speed in each cycle to control selected functions of the mechanism, a cyclically operable auxiliary control device rotatable through a predetermined angle at a slower speed in each cycle to control other functions of the mechanism, control means operable selectively to initiate an operating cycle of each of said control devices, and other control means actuated by said auxiliary device in its rotation to initiate additional operating cycles of the main control device and thereby effect continuous rotation of that device until the auxiliary device completes its operating cycle.

69. A selectively operable mechanism having, in combination, a main control device operable through a fixed cycle to control predetermined functions of the mechanism, an auxiliary control device operable through a fixed cycle to control other functions of the mechanism, each cycle of said auxiliary control device corresponding to a plurality of cycles of said main control device, control means operable to initiate an operating cycle of said main control device only, other control means operable to simultaneously initiate an operating cycle of each control device, and means actuated by the auxiliary control device to initiate one or more additional operating cycles of the main control device.

70. A control tape perforator having, in combination, a keyboard including keys operable manually to select character signals to be perforated in the tape, a main cam shaft operable through a predetermined cycle in response to each key actuation to control the perforation of a selected signal in the tape, a selecting device operable under control of other keys of said keyboard to select function signals to be perforated in the tape, an auxiliary cam shaft operable through a predetermined cycle in response to the actuation of said other keys, and means actuated by said auxiliary cam shaft to initiate an operating cycle of the main cam shaft.

71. A control tape perforator having, in combination, a keyboard including a plurality of character keys and a plurality of function keys operable manually to select character signals to be perforated in the tape, a main cam shaft operable through a predetermined cycle in response to each character key actuation to control the perforation of a selected signal in the tape, a selecting device operable under control of said function keys to select function signals to be perforated in the tape, said function keys being effective when actuated to initiate operating cycles of the main cam shaft, an auxiliary cam shaft operable through a predetermined cycle in response to each operation of the selecting device to control the operation of the device, the operating cycle of said auxiliary shaft being substantially longer than an operating cycle of the main shaft, and means actuated by said auxiliary shaft to maintain the main shaft in operation until the auxiliary shaft completes its operating cycle.

72. A cyclically operable machine having, in combination, a main control shaft and an auxiliary control shaft operable in cycles of different length to control predetermined operations of the machine, the cycle of said auxiliary shaft being a multiple of the cycle of the main shaft, a control device operable to simultaneously initiate the operation of said shafts in their respective cycles and to determine the character of an operation controlled by said main shaft in its cycle, other means operative automatically while said auxiliary shaft is operating through its cycle to initiate successive cycles of said main shaft, and mechanism controlled by said auxiliary shaft operative to determine the character of an operation controlled by said main shaft in one of the automatically initiated cycles.

73. A cyclically operable machine having, in combination, a main rotary controller normally rotatable in a single cycle to control selected operations of the machine, an auxiliary rotary controller rotatable in cycles each corresponding to a plurality of cycles of the main controller, means operable to initiate a cycle of the main controller and to determine the character of one of the operations controlled thereby, other means for initiating an operating cycle of said auxiliary controller and for initiating a series of cycles of the main controller, and mechanism controlled by said auxiliary controller operative to determine the character of an operation controlled by the main controller in one of said plurality of cycles.

74. A cyclically operable machine having, in combination, a pair of control shafts operable in cycles of different lengths to control predetermined operations of the machine, the cycle of one shaft being a multiple of the cycle of the other shaft, control means operable to simultaneously initiate the operation of said one shaft in a single cycle and of said other shaft in a plurality of cycles, and mechanism controlled by said one shaft effective to determine the character of an operation controlled by said other shaft in one of its cycles.

75. A cyclically operable machine having, in combination, a pair of control shafts operable in cycles of different lengths to control predetermined operations of the machine, the cycle of one of said shafts being a multiple of the cycle of the other shaft, means operable to simultaneously initiate an operating cycle of each shaft, and mechanism controlled by said one shaft operative to initiate an additional operating cycle of said other shaft.

76. In a selector mechanism, in combination, a series of selector elements adapted to be set in different permutational combinations, a control member having codal elements adapted to coact with said selector elements to govern the permutational setting thereof, the arrangement of said codal elements being variable selectively, and means for shifting said control member to move the codal elements into and out of controlling relation to said selector elements.

77. In a machine of the class described, in combination, a series of members adapted to be set in different permutational combinations each individual to a predetermined position in a line of composition, a control unit including means adapted to be set to designate the location in the line of the initial digit position of one or more tabular columns, a plurality of manually operable keys representing successive digit positions of a tabular column, and selecting mechanism operable in response to the actuation of any one of said keys and under joint control of the actuated key and said unit to set said members in a selected combination.

78. In a machine of the class described, in combination, a series of members adapted to be set in different permutational combinations each an individual to a predetermined position in a line of composition, tabulating mechanism including a control unit adapted to be preset in accordance with a selected tabular pattern, a plurality of manually operable keys representing successive digit positions of a tabular column, and a selector mechanism operable under joint control of said unit and said keys to set said members in permutational combinations corresponding to the line positions of the different columns of said pattern.

79. A control form for selector mechanisms and the like comprising, in combination, a pair of relatively shiftable members each having a series of groups of elements arranged in code combinations, the code combinations of one member designating predetermined sections of a line of composition and the code combinations of the other members designating sub-divisions of a section, at least one of said members being shiftable so as to aline any two selected code combinations of the respective members and thereby form a composite code combination designating any predetermined position in the line and equal in length to one of said sub-divisions.

80. A control form for composing machines and the like comprising, in combination, two relatively shiftable members each having a plurality of groups of elements arranged in permutational code combinations, the code groups of one of said members representing predetermined sections of a line of composition and the code groups of the other member representing sub-divisions of a section, said members being relatively shiftable so as to aline selected code groups of the respective members and thereby form composite code combinations representative of any desired position in the line and corresponding in length to one of said sub-divisions.

81. A control form for selector mechanisms and the like comprising a plurality of relatively shiftable members, each of said members having a plurality of groups of elements arranged in permutational code combinations, said members being relatively shiftable to aline selected code groups of the respective members and thereby form composite code combinations each having a number of code units equal to the sum of the units of said groups.

HOWARD D. COLMAN.